United States Patent
Liu

(10) Patent No.: US 12,172,072 B2
(45) Date of Patent: Dec. 24, 2024

(54) CONTROLLING A VIRTUAL OBJECT TO TAKE ACTION WHEN TARGETED

(71) Applicant: TENCENT TECHNOLOGY (SHENZHEN) COMPANY LIMITED, Guangdong (CN)

(72) Inventor: Zhi Hong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 293 days.

(21) Appl. No.: 17/459,037

(22) Filed: Aug. 27, 2021

(65) Prior Publication Data
US 2021/0387087 A1 Dec. 16, 2021

Related U.S. Application Data

(63) Continuation of application No. PCT/CN2020/103006, filed on Jul. 20, 2020.

(30) Foreign Application Priority Data

Aug. 23, 2019 (CN) .......................... 201910784863.5

(51) Int. Cl.
*A63F 13/42* (2014.01)
*A63F 13/2145* (2014.01)
(Continued)

(52) U.S. Cl.
CPC .......... *A63F 13/42* (2014.09); *A63F 13/2145* (2014.09); *G06F 3/04815* (2013.01);
(Continued)

(58) Field of Classification Search
CPC .................. A63F 13/42; A63F 13/2145; A63F 2300/1075
See application file for complete search history.

(56) References Cited

U.S. PATENT DOCUMENTS 6,057,845 A * 5/2000 Dupouy .............. G06F 3/04883
  382/187
8,118,653 B2 * 2/2012 Langridge ............. A63F 13/422
  463/7
(Continued)

FOREIGN PATENT DOCUMENTS

CN 103252087 A 8/2013
CN 104436657 A 3/2015
(Continued)

OTHER PUBLICATIONS

Chinese Office Action for Chinese Application No. 201910784863.5 dated Aug. 27, 2020, 6 pages.
(Continued)

*Primary Examiner* — Corbett B Coburn
(74) *Attorney, Agent, or Firm* — Sughrue Mion, PLLC

(57) ABSTRACT

A method for controlling a virtual object and a related apparatus are provided. The method includes displaying a user interface (UI) having a virtual environment image and an interactive panel region. The virtual environment image is an image in which a virtual environment is observed. The method also includes receiving a preset operation in a target region in the UI, with the target region being a region associated with the virtual environment image but not with the interactive panel region; and controlling the virtual object according to the preset operation to perform a corresponding motion in the virtual environment.

18 Claims, 12 Drawing Sheets

(51) Int. Cl.
*G06F 3/04815* (2022.01)
*G06F 3/0488* (2022.01)

(52) U.S. Cl.
CPC .... *G06F 3/0488* (2013.01); *A63F 2300/1075* (2013.01); *A63F 2300/8076* (2013.01)

(56) References Cited

U.S. PATENT DOCUMENTS

| | | | | |
|---|---|---|---|---|
| 10,589,180 | B2* | 3/2020 | Jo | A63F 13/30 |
| 2009/0311652 | A1* | 12/2009 | Langridge | A63F 13/837 |
| | | | | 434/11 |
| 2015/0157940 | A1* | 6/2015 | Hall | A63F 13/5372 |
| | | | | 463/31 |
| 2017/0368462 | A1* | 12/2017 | Jo | A63F 13/35 |
| 2021/0129021 | A1 | 5/2021 | Liu et al. | |

FOREIGN PATENT DOCUMENTS

| | | | |
|---|---|---|---|
| CN | 106502563 | A | 3/2017 |
| CN | 108363531 | A | 8/2018 |
| CN | 108926840 | A | 12/2018 |
| CN | 109126129 | A | 1/2019 |
| CN | 109491579 | A | 3/2019 |
| CN | 109718559 | A | 5/2019 |
| CN | 110075522 | A | 8/2019 |
| CN | 110507993 | A | 11/2019 |
| JP | 2016-93361 | A | 5/2016 |

OTHER PUBLICATIONS

Chinese Office Action for Chinese Application No. 201910784863.5 dated Apr. 10, 2020, 8 pages.
International Search Report for PCT/CN2020/103006 dated Oct. 22, 2020.
Written Opinion for PCT/CN2020/103006 dated Oct. 22, 2020.
Translation of Written Opinion dated Oct. 22, 2020, issued in PCT/CN2020/103006.
Search Report dated Jan. 5, 2023, issued by the Intellectual Property Office of Singapore in application No. 11202109543U.
Written Opinion dated Jan. 9, 2023, issued by the Intellectual Property Office of Singapore in application No. 11202109543U.

* cited by examiner

CONTROLLING A VIRTUAL OBJECT TO TAKE ACTION WHEN TARGETED

CROSS-REFERENCE TO RELATED APPLICATIONS

This application is a continuation application of International Application No. PCT/CN2020/103006, filed on Jul. 20, 2020, which claims priority to Chinese Patent Application No. 201910784863.5, entitled "METHOD AND APPARATUS FOR CONTROLLING VIRTUAL OBJECT, DEVICE, AND MEDIUM" and filed with the China National Intellectual Property Administration on Aug. 23, 2019, the disclosures of which are incorporated by reference in their entireties.

FIELD

The disclosure relates to the field of computers, and in particular, to the control of a virtual object.

BACKGROUND

In application programs based on a three-dimensional virtual environment, for example, in a first-person shooting (FPS) game, a user may operate a virtual object in a virtual environment to perform motions such as walking, running, climbing, shooting, and fighting. When controlling the virtual object to perform different motions, the user needs to trigger corresponding user interface (UI) controls in a UI.

There are UI controls corresponding to various motions to be performed by a virtual object in a UI, and the UI controls corresponding to various motions are located at different positions of the UI. For example, direction buttons are located on a left side of the UI, and a running button is located on a right side of the UI. When the virtual object performs a relatively large number of motions, a quantity of UI controls corresponding to the motions in the UI also increases. The user needs to memorize the motions or functions corresponding to the UI controls as well as the positions corresponding to the UI controls.

SUMMARY

Embodiments of the disclosure provide a method for controlling a virtual object and a related apparatus, which may resolve the problem in the related art that when a virtual object is controlled to perform various motions, respective user interface (UI) controls corresponding to the motions need to be triggered, making it impossible for a user to quickly control the virtual object to perform various motions.

According to an aspect of an example embodiment of the disclosure, a method for controlling a virtual object is provided, including:
 displaying a user interface (UI), the UI comprising a virtual environment image and an interactive panel region, the virtual environment image being an image in which a virtual environment is observed;
 receiving a preset operation in a target region in the UI, the target region comprising a region pertaining to the virtual environment image but not pertaining to the interactive panel region; and
 controlling the virtual object according to the preset operation to perform a corresponding motion in the virtual environment.

According to another aspect of an example embodiment of the disclosure, an apparatus for controlling a virtual object is provided, including:
 at least one memory configured to store program code; and at least one processor configured to read the program code and operate as instructed by the program code, the program code including:
 display code configured to cause the at least one processor to display a user interface (UI), the UI comprising a virtual environment image and an interactive panel region, the virtual environment image being an image in which a virtual environment is observed;
 receiving code configured to cause the at least one processor to receive a preset operation in a target region in the UI, the target region comprising a region pertaining to the virtual environment image but not pertaining to the interactive panel region; and
 control code configured to cause the at least one processor to control the virtual object according to the preset operation to perform a corresponding motion in the virtual environment.

According to another aspect of an example embodiment of the disclosure, a computer device is provided, including a processor and a memory, the memory storing at least one instruction, at least one program, a code set, or an instruction set, and the at least one instruction, the at least one program, the code set, or the instruction set being loaded and executed by the processor to implement the method for controlling a virtual object according to the foregoing aspect.

According to still another aspect of an example embodiment of the disclosure, a storage medium is provided, configured to store a computer program, the computer program being configured to perform the method for controlling a virtual object according to the foregoing aspect.

According to still another aspect of an example embodiment of the disclosure, a computer program product including instructions is provided, the instructions, when run on a computer, causing the computer to perform the method for controlling a virtual object according to the foregoing aspect.

BRIEF DESCRIPTION OF THE DRAWINGS

To describe technical solutions in example embodiments of the disclosure more clearly, the following briefly introduces the accompanying drawings for describing the example embodiments. The accompanying drawings in the following description show only some embodiments of the disclosure, and a person of ordinary skill in the art may still derive other accompanying drawings from these accompanying drawings without creative efforts.

DETAILED DESCRIPTION

Figure 1:
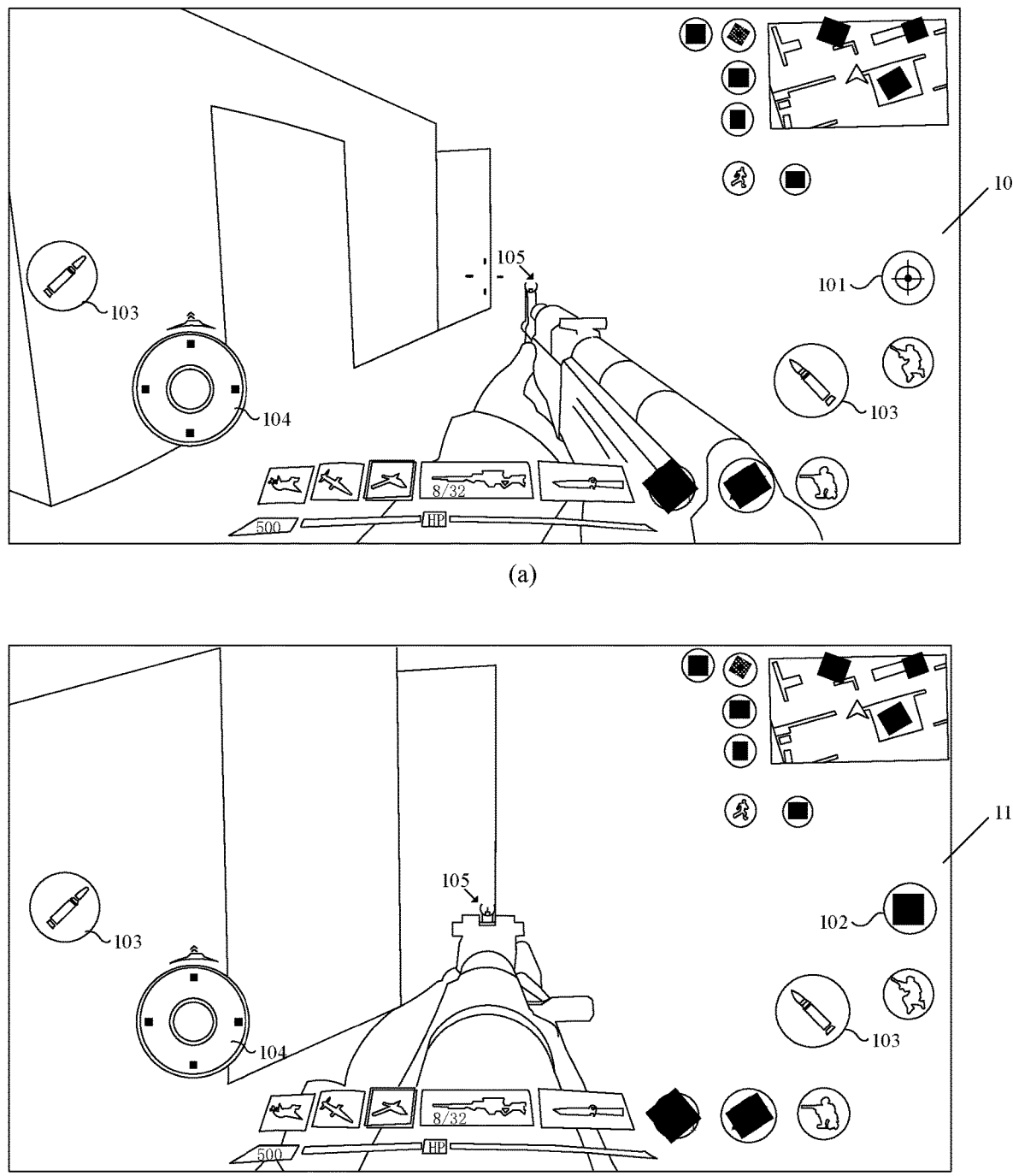
FIG. 1 is a schematic diagram of an example of an interface of controlling a virtual object to open a sight in a virtual environment.

To make objectives, technical solutions, and advantages of the disclosure clearer, the following further describes implementations of the disclosure in detail with reference to the accompanying drawings.

First, terms involved in the example embodiments of the disclosure are introduced as follows:

A virtual environment is displayed (or provided) by an application program when run on a terminal. The virtual environment may be a simulated environment of a real world, or may be a semi-simulated and/or semi-fictional environment, or may be a completely fictional environment. The virtual environment may be any one of a two-dimensional virtual environment, a 2.5-dimensional virtual environment, and a three-dimensional virtual environment. This is not limited in the disclosure. A description is made by using an example in which the virtual environment is a three-dimensional virtual environment in the following embodiments.

A virtual object is a movable object in a virtual environment. The movable object may be a virtual character, a virtual animal, a cartoon character, or the like, such as a character, an animal, a plant, an oil drum, a wall, or a stone or any type of an object displayed in a virtual environment (e.g., a three-dimensional virtual environment). In an embodiment, the virtual object is a three-dimensional model created based on a skeletal animation technology. Each virtual object has a shape and a size in the three-dimensional virtual environment, and occupies some space in the three-dimensional virtual environment.

A virtual item is an item that may be used in association with a virtual object may in a virtual environment. The virtual item includes a virtual weapon used by the virtual object, an accessory corresponding to the virtual weapon, virtual food, virtual medicine, clothes, ornament, or the like. The embodiments of the disclosure are described by using an example in which the virtual item is a virtual weapon. The virtual weapon includes a common firearm such as a handgun, a rifle, or a sniper rifle, a bow and arrow, a crossbow, a pike, a dagger, a sword, a knife, an ax, a bomb, a missile, or the like.

A first-person shooting (FPS) game is a shooting game in which a user may play from a first-person perspective. A virtual environment image in the game is an image (e.g., a picture or any graphical representation) in which a virtual environment is observed from a certain perspective (e.g., the perspective of a first virtual object). In the game, at least two virtual objects play in a single-round battle mode in the virtual environment. The virtual object escapes attacks by other virtual objects and dangers (such as a poison gas area and a swamp) in the virtual environment to survive in the virtual environment. When the hit point of the virtual object in the virtual environment is zero, the life of the virtual object in the virtual environment ends, and the final virtual object surviving in the virtual environment wins. In an embodiment, a battle starts when a first client joins the battle, and ends when the last client exits the battle. Each client may control one or more virtual objects in the virtual environment. In an embodiment, arena modes of the battle may include a single-player battle mode, a two-player team battle mode, or a multi-player team battle mode. The battle mode is not limited in the embodiments of the disclosure.

A trigger control is a user interface (UI) control. The UI control is any visual control or element that may be seen in a UI of an application program, for example, a control such as a picture, an input box, a text box, a button, or a label. Some UI controls respond to an operation of a user. For example, if the user triggers an attack control corresponding to a handgun, a virtual object is controlled to use the handgun to make an attack.

In the disclosure, when a virtual item is "equipped, carried, or assembled", it means that a virtual object owns the virtual item, or a virtual object owns an inventory with an inventory slot and the virtual item is stored in the inventory of the virtual object, or a virtual object is using the virtual item.

A method provided in the disclosure may be applied to a virtual reality (VR) application program, a three-dimensional map program, a military simulation program, an FPS game, a multiplayer online battle arena (MOBA) game, and the like. An application in a game is used as an example for description in the following embodiments.

A game based on a virtual environment may be formed by a map of one or more game worlds. The virtual environment in the game simulates scenarios in the real world. A user may control a virtual object in the game to perform actions such as walking, running, jumping, shooting, fighting, driving, throwing, standing up, and lying prone in the virtual environment, which has relatively high interactivity. In addition, a plurality of users may form a team online to play an arena game. In an application program corresponding to a game, UI controls are set in a UI. A user triggers different UI controls to control a virtual object to perform different motions in a virtual environment. For example, the user triggers UI controls (e.g., direction buttons) corresponding to a movement function to control the virtual object to move in the virtual environment. In another example, when the virtual object is using a handgun, the user triggers a UI control (e.g., a fire button) corresponding to a fire function (using a virtual weapon to make an attack) to control the virtual object to use the handgun to make an attack in the virtual environment. The UI controls are distributed in various regions in the UI, and the user needs to memorize the functions of the UI controls and the regions where the UI controls are located, so that the virtual object may be quickly controlled to perform corresponding motions.

FIG. 1 is a schematic diagram of an example of an interface of controlling a virtual object to open a sight (or line of sight) in a virtual environment. As shown in (a) of FIG. 1, an aiming control 101, an attack control 103, and a moving control 104 are displayed in an interface 10 of preparing to open a sight. For example, the aiming control 101 is located in a right side region of the interface 10 of preparing to open a sight, and is located on a lower side of a corresponding minimap of the virtual environment. In an embodiment, there is one aiming control 101 in the interface 10. In some embodiments, there are two or more aiming controls 101. The quantity and positions of the aiming controls 101 are not limited in the disclosure. In an embodiment, a user may customize the positions and quantity of the aiming controls 101. For example, the user sets three aiming controls 101 in a right side region of the interface 10 of preparing to open a sight. In an embodiment, when using a virtual item like a firearm that needs to be aimed at a target, the user triggers the aiming control 101 to control the virtual object to open a sight 105.

The attack controls 103 are separately located in a left side region and a right side region of the interface 10 of preparing to open a sight, and the attack control 103 located in the left side region of the interface 10 is located at the upper left of the moving control 104. In an embodiment, there are two attack controls 103 in the interface 10. In some embodiments, there may be one or three or more attack controls 103. The quantity and positions of the attack controls 103 are not limited in the disclosure. In an embodiment, a user may customize the positions and quantity of the attack controls 103. For example, the user sets three attack controls 103 in a left side region, a right side region, and a middle region of the interface 10 of preparing to open a sight.

The moving control 104 is located in the left side region of the interface 10 of preparing to open a sight and is located at the lower right of the attack control 103. In an embodiment, the user may trigger the moving control 104 to control the virtual object to move in the virtual environment.

After the virtual object opens the sight 105, the UI is shown in (b) of FIG. 1, and a close control 102 is also displayed in an interface 11 of an opened sight. The close control 102 is located at a position where the aiming control 101 is originally located. That is, a display of the aiming control 101 is switched to a display of the close control 102. In this case, the sight 105 is opened corresponding to the firearm that is being in use. The display position of the firearm is switched from a right side region of the UI to the center of the UI. The sight 105 is displayed at the center of the interface 11 of an opened sight, and is in an aiming state. If the user triggers the close control 102, the sight 105 is closed, and the interface 11 of an opened sight is changed to the interface 10 of preparing to open a sight shown in (a) of FIG. 1.

Based on the method provided in this example, a corresponding UI control needs to be triggered in order for the virtual object controlled by the user to perform a corresponding action. For example, the user needs to trigger the aiming control 101 to control the virtual object to open the sight 105. The user further needs to trigger the corresponding close control 102 to control the virtual object to stop the action (e.g., stop opening the sight 105). The steps are relatively complex, and the user needs to memorize the corresponding functions and positions of the UI controls. The user may not recall a UI control corresponding to an action and a position corresponding to the UI control, resulting in a delay in performing a corresponding action by the virtual object.

Figure 2:
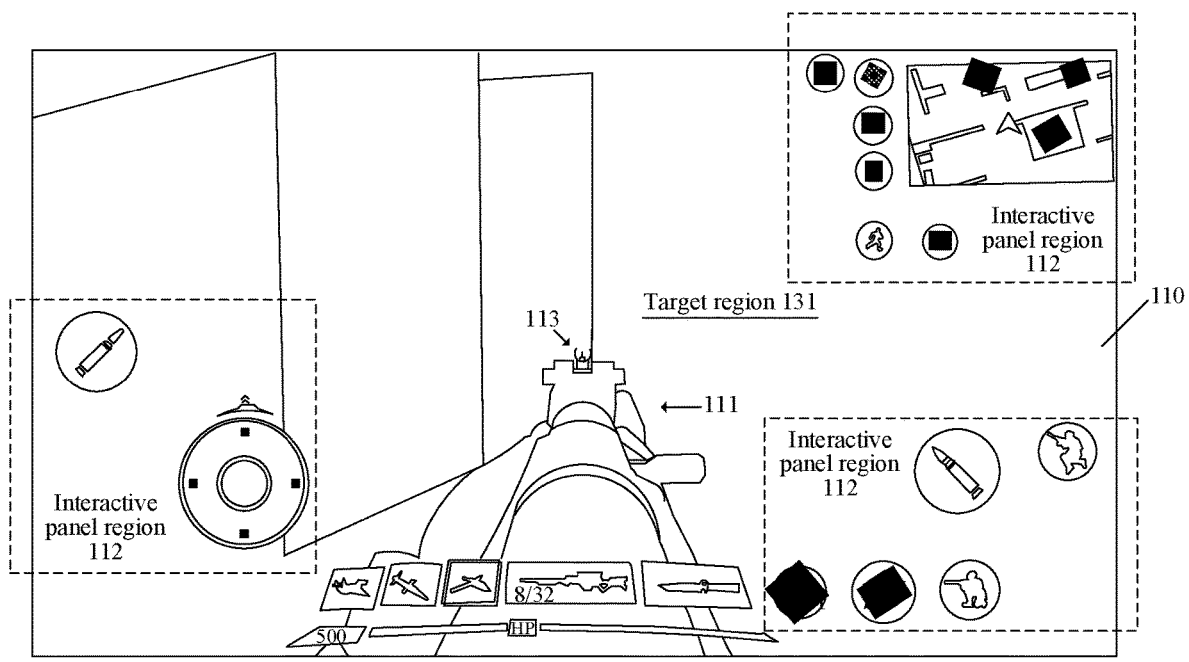
FIG. 2 is a schematic diagram of an interface of controlling a virtual object to open a sight according to an example embodiment of the disclosure.

The disclosure provides a method for controlling a virtual object. FIG. 2 is a schematic diagram of an interface of controlling a virtual object according to an example embodiment of the disclosure.

An example in which a user controls a virtual object to open an accessory corresponding to a virtual item in a virtual environment is used for description. In an example, the virtual item used by the virtual object is a sniper rifle, and the accessory corresponding to the virtual item is a sight 113. Compared with the example in which the aiming control 101 and the close control 102 are displayed in the UI in FIG. 1, no control about opening or closing the sight 113 is displayed in an interface 110 of an opened sight in FIG. 2. The user may use a quick operation to control the virtual object to open the sight 113. In an embodiment, the quick operation is a double-tap operation. In an embodiment, a target region 131 is provided in the UI, and the target region 131 includes a region pertaining to a virtual environment image but not pertaining to an interactive panel region 112. For example, the target region 131 is a right side region in the UI, and the right side region is a region not pertaining to the interactive panel region 112. A location of the target region 131 is not limited. In an embodiment, after the user performs the double-tap operation in the target region 131, the UI displays the interface 110 of an opened sight, the sight 113 of the virtual item (e.g., the sniper rifle) 111 used by the virtual object is located at the center of the UI and is in an aiming state, and the sight 113 is opened, which is the same as the effect of opening the sight 105 by tapping the aiming control 101 by the user shown in (a) of FIG. 1.

In an embodiment, when the user needs to close the sight 113, the user may use a quick operation to close the sight 113. For example, the quick operation to close the sight 113 is a double-tap operation. In an embodiment, the target region 131 of closing the sight 113 and the target region 131 of opening the sight 113 are the same region or different regions. When the user performs the double-tap operation in the target region 131, the virtual object is controlled to close the sight 113. In an embodiment, the virtual item (e.g., the sniper rifle) used by the virtual object is changed to a state before the sight 113 is opened.

In an embodiment, the user may set a range of the target region. For example, the user sets a circular region with the center of the UI as the center and a predetermined length (e.g., 10 units of length) as the radius as the target region. The user may control the virtual object to perform a motion corresponding to the quick operation provided that the quick operation is performed within the target region 131. In an embodiment, the quick operation may be at least one of a single-tap operation, a double-tap operation, a swipe operation, a drag operation, a long-press operation, a double-tap and long-press operation, and a two-finger swipe operation. In an embodiment, the user may set corresponding motion controls corresponding to motions of the virtual object. For example, when the user uses the quick operation to control the virtual object, the display of the controls corresponding to the motions is canceled in the UI. Alternatively, the user sets the positions and quantity of the controls corresponding to the motions. It would be understood that the user may perform different quick operations in the target region 131 to control the virtual object to perform corresponding motions.

Figure 3:
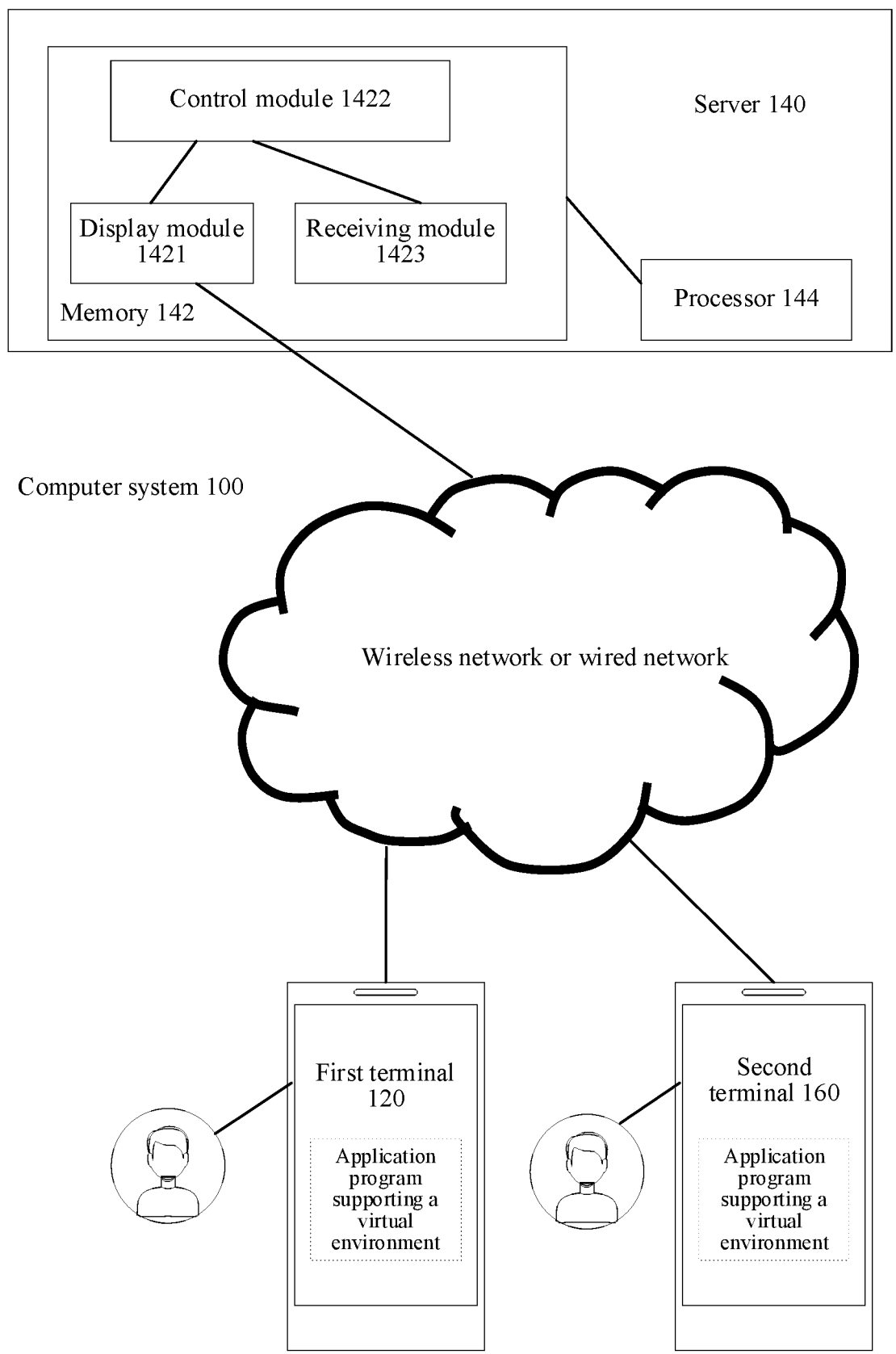
FIG. 3 is a block diagram of an implementation environment according to an example embodiment of the disclosure.

FIG. 3 is a structural block diagram of a computer system according to an example embodiment of the disclosure. The computer system 100 includes a first terminal 120, a server 140, and a second terminal 160.

An application program supporting a virtual environment is installed and run on the first terminal 120. The application program may be any one of a VR application program, a three-dimensional map program, a military simulation program, an FPS game, a MOBA game, a multiplayer gunfight survival game, and the like. The first terminal 120 is a terminal used by a first user. The first user uses the first terminal 120 to control a virtual object in a virtual environment to perform motions. The motions include, for example but are not limited to, at least one of body posture adjustment, crawling, walking, running, cycling, jumping, driving, shooting, throwing, and using a virtual item. For example, the virtual object is a virtual character, such as a simulated character object or a cartoon character object.

The first terminal 120 is connected to the server 140 by using a wireless network or a wired network.

The server 140 includes at least one of one server, a plurality of servers, a cloud computing platform, and a virtualization center. For example, the server 140 includes a processor 144 and a memory 142. The memory 142 includes a display module 1421, a control module 1422, and a receiving module 1423. The server 140 is configured to provide a backend service for an application program supporting a three-dimensional virtual environment. In an embodiment, the server 140 takes on primary computing work, and the first terminal 120 and the second terminal 160 take on secondary computing work; alternatively, the server 140 takes on secondary computing work, and the first terminal 120 and the second terminal 160 take on primary computing work; alternatively, collaborative computing is performed by using a distributed computing architecture among the server 140, the first terminal 120, and the second terminal 160.

An application program supporting a virtual environment is installed and run on the second terminal 160. The application program may be any one of a VR application program, a three-dimensional map program, a military simulation program, an FPS game, a MOBA game, a multiplayer gunfight survival game, and the like. The second terminal 160 is a terminal used by a second user. The second user uses the second terminal 160 to control a virtual object in a virtual environment to perform motions. The motions include, for example but are not limited to, at least one of body posture adjustment, crawling, walking, running, cycling, jumping, driving, shooting, throwing, and using a virtual item. For example, the virtual object is a virtual character, such as a simulated character object or a cartoon character object.

In an embodiment, the virtual object controlled by the first user and the virtual object controlled by the second user are in the same virtual environment. In an embodiment, the virtual object controlled by the first user and the virtual object controlled by the second user may pertain to the same team or the same organization, and have a friend relationship with each other or have a temporary communication permission.

In an embodiment, the application programs installed on the first terminal 120 and the second terminal 160 are the same, or the application programs installed on the two terminals are the same type of application programs on different control system platforms. The first terminal 120 may be generally one of a plurality of terminals, and the second terminal 160 may be generally one of a plurality of terminals. In this embodiment, only the first terminal 120 and the second terminal 160 are used as an example for description. The first terminal 120 and the second terminal 160 are of the same device type or of different device types. The device type includes, for example but not limited to, at least one of a smartphone, a tablet computer, an e-book reader, a Moving Picture Experts Group Audio Layer III (MP3) player, a Moving Picture Experts Group Audio Layer IV (MP4) player, a laptop, and a desktop computer. The following embodiment is described by using an example in which the terminal includes a smartphone.

A person skilled in the art would understand that there may be more or fewer terminals. For example, there may be only one terminal, or there may be dozens of or hundreds of terminals or more. The quantity and the device type of the terminal are not limited in the embodiments of the disclosure.

Figure 4:
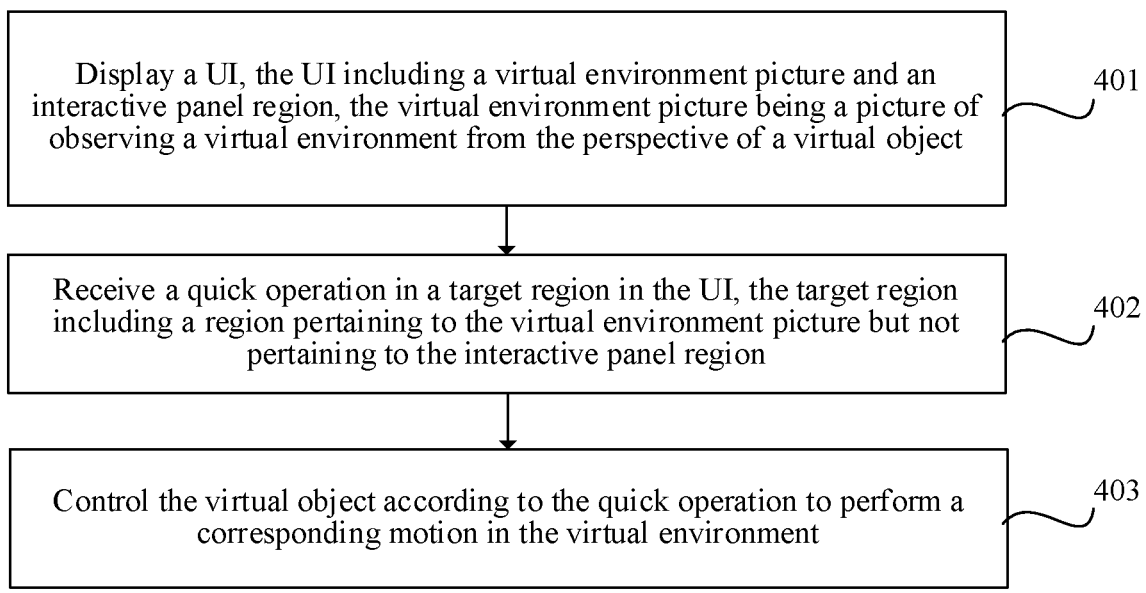
FIG. 4 is a flowchart of a method for controlling a virtual object according to an example embodiment of the disclosure.

FIG. 4 is a flowchart of a method for controlling a virtual object according to an example embodiment of the disclosure. The method is applicable to the first terminal 120 and/or the second terminal 160 in the computer system shown in FIG. 3 or another terminal in the computer system. The method includes the following operations:

Operation 401: Display a UI, the UI including a virtual environment image and an interactive panel region, the virtual environment image being an image of observing a virtual environment from the perspective of (or around) a virtual object.

The perspective of observing the virtual environment is an observation angle for observation from a first-person perspective or a third-person perspective of the virtual object in the virtual environment. In an embodiment, in the embodiments of the disclosure, the perspective is an angle for observing the virtual object by using a camera model in the virtual environment.

In an embodiment, the camera model automatically follows the virtual object in the virtual environment. That is, when a position of the virtual object in the virtual environment changes, a position of the camera model following the virtual object in the virtual environment changes simultaneously, and the camera model is always within a preset distance range of the virtual object in the virtual environment. In an embodiment, in the automatic following process, relative positions of the camera model and the virtual object remain unchanged.

The camera model is a three-dimensional model located around a virtual object in a virtual environment. When a first-person perspective is used, the camera model is located near the head of the virtual object or at the head of the virtual object. When a third-person perspective is used, the camera model may be located behind the virtual object and bound to the virtual object, or may be located at any position away from the virtual object by a preset distance. The virtual object located in the virtual environment may be observed from different angles through the camera model. In an embodiment, when the third-person perspective is a first-person over-shoulder perspective, the camera model is located behind the virtual object (for example, at the head and shoulders of the virtual character). In an embodiment, in addition to the first-person perspective and the third-person perspective, the perspective also includes other perspectives, such as a top perspective. When the top perspective is used, the camera model may be located above the head of the virtual object. The top perspective is a perspective for observing the virtual environment with an angle from the air. In an embodiment, the camera model is not actually displayed in the virtual environment. In other words, the camera model is not displayed in the virtual environment displayed in the UI.

A description is made by using an example in which the camera model is located at any position away from the virtual object by a preset distance. In an embodiment, one virtual object corresponds to one camera model, and the camera model may rotate with the virtual object as a rotation center. For example, the camera model rotates with any point of the virtual object as the rotation center. During rotation, the camera model not only rotates in angle, but also deviates in displacement. During rotation, a distance between the camera model and the rotation center remains unchanged, that is, the camera model rotates on a surface of a sphere with the rotation center as a sphere center. Any point of the virtual object may be the head or the torso of the virtual object, or any point around the virtual object. This is not limited in the embodiments of the disclosure. In an embodiment, when the camera model observes the virtual object, a center orientation of the perspective of the camera model is a direction of a point of the sphere surface where the camera model is located pointing to the sphere center.

In an embodiment, the camera model may alternatively observe the virtual object at a preset angle in different directions of the virtual object.

Figure 5:
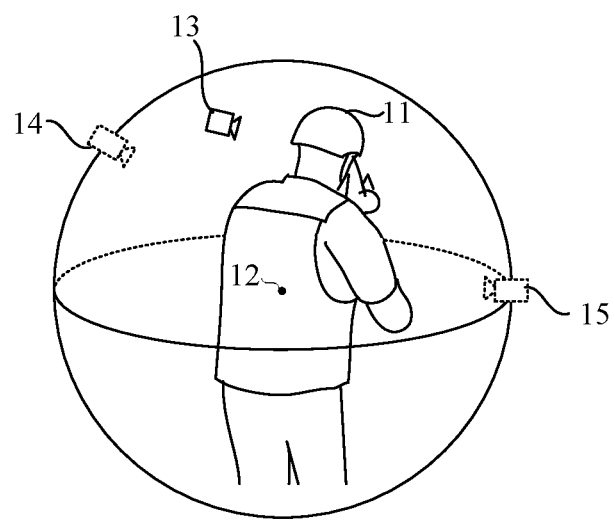
FIG. 5 is a schematic diagram of a camera model corresponding to the perspective of a virtual object according to an example embodiment of the disclosure.

For example, referring to FIG. 5, a point in a virtual object 11 is determined as a rotation center 12, and a camera model rotates around the rotation center 12. In an embodiment, the camera model is provided with an initial position, and the initial position is a position above and behind the virtual object (for example, a position behind the head). For example, as shown in FIG. 5, the initial position is a position 13, and when the camera model rotates to a position 14 or a position 15, a perspective direction of the camera model changes as the camera model rotates.

In an embodiment, the virtual environment displayed in the virtual environment image includes at least one of the following elements: a mountain, a plain, a river, a lake, a sea, a desert, a sky, a plant, a building, and a vehicle. Herein, the term "picture" used throughout the present specification is an inclusive term to denote various forms of image information that may be known in the art, such as an "image" and a "frame", and any form of visual representation of the image information.

In an embodiment, as shown in FIG. 2, the UI includes the interactive panel region 112. The interactive panel region 112 is provided with UI controls that control the virtual object to perform motions, a message sending control, a voice control, an emoticon control, a setting control, and the like. The foregoing controls are used for a user to control the virtual object to perform corresponding motions in the virtual environment, or to send a message (for example, including: a text message, a voice message, and/or an emoticon message) to a teammate in the same team, or to set action attributes (for example, a running speed) of the virtual object in the virtual environment, or to set attributes (such as sensitivity, an attack range, and lethality of a firearm) of a virtual weapon, or to display a position of the virtual object controlled by the user in the virtual environment (for example, a thumbnail map of the virtual environment is displayed in the UI). The user learns a current state of the virtual object instantly through the interactive panel region 112, and may use the interactive panel region 112 at any time to control the virtual object to perform corresponding motions. In some embodiments, the shape of the interactive panel region is rectangular or circular, or the shape of the interactive panel region corresponds to the shape of the UI controls in the UI. The shape of the interactive panel region is not limited in the disclosure.

Operation 402: Receive a quick operation in a target region in the UI, the target region including a region pertaining to the virtual environment image but not pertaining to the interactive panel region.

In an embodiment, the quick operation includes at least one of a double-tap operation, a double-tap and long-press operation, a two-finger horizontal swipe operation, and a two-finger vertical swipe operation.

In an embodiment, an example in which a region pertaining to the virtual environment image is a region A and the interactive panel region is a region B is used for description, and the target region includes any of the following forms:

First, the target region is a region corresponding to the region A.

In this example, the target region includes a region pertaining to the virtual environment image but not pertaining to the interactive panel region. For example, in the example embodiment of FIG. 2, a user may perform the quick operation in a region where UI controls and a minimap are not included, for example, a region between a moving control and an attack control, as the region that pertains to the virtual environment image but does not pertain to the interactive panel region.

Second, the target region is a region corresponding to the region A and the region B.

In this example, the target region includes regions corresponding to the virtual environment image and the interactive panel region respectively. For example, in the example embodiment of FIG. 2, a user may perform the quick operation in the regions corresponding to the virtual environment image and the interactive panel region simultaneously. For example, the user may perform the quick operation in a region where the UI controls or the minimap is located or may perform the quick operation in a region where the UI controls or the minimap is not located. That is, the user may perform the quick operation at any position in the UI 110.

Third, the target region is a region corresponding to the region B and a part of the region A.

In this example, the target region includes a part of a region corresponding to the virtual environment image and a region corresponding to the interactive panel region. For example, in the example embodiment of FIG. 2, a user may perform the quick operation in an interactive panel region and/or a right side region of the virtual environment image. That is, the user may perform the quick operation in a right side region of the UI 110 and an interactive panel region corresponding to UI controls in a left side region of the UI 110. In an embodiment, the part of the region corresponding to the virtual environment image may be any region of a left side region, a right side region, an upper side region, and a lower side region in the virtual environment image.

Fourth, the target region is a region corresponding to the region A and a part of the region B.

In this example, the target region is a region corresponding to the virtual environment image and a part of a region corresponding to the interactive panel region. For example, in the example embodiment of FIG. 2, a user may perform the quick operation in a region corresponding to the virtual environment image and/or a right-side interactive panel region, that is, the user may perform the quick operation in a region other than a left-side interactive panel region of the UI 110. In an embodiment, the part of the interactive panel region may be any region of a left-side interactive panel region, a right-side interactive panel region, an upper-side interactive panel region, and a lower-side interactive panel region.

Fifth, the target region is a region corresponding to a part of the region A and a part of the region B.

In this example, the target region is a region corresponding to a part of a region corresponding to the virtual environment image and a part of a region corresponding to the interactive panel region. For example, in the example embodiment of FIG. 2, a user may perform the quick operation in a region corresponding to a left-side virtual environment image and/or a left-side interactive panel region. That is, the user may perform the quick operation in a left side region of the UI 110. For example, the user may perform the quick operation in a region corresponding to a right-side virtual environment image and/or a left-side interactive panel region. That is, the user may perform the quick operation in a region other than a right-side interactive panel region and a left-side virtual environment image. The user may perform the quick operation on the moving control and the attack control, or may perform the quick operation in a region corresponding to the right-side virtual environment image.

In an embodiment, based on the expression form of the foregoing target region, the UI may not display the interactive panel region, that is, hide the interactive panel region.

Figure 6:
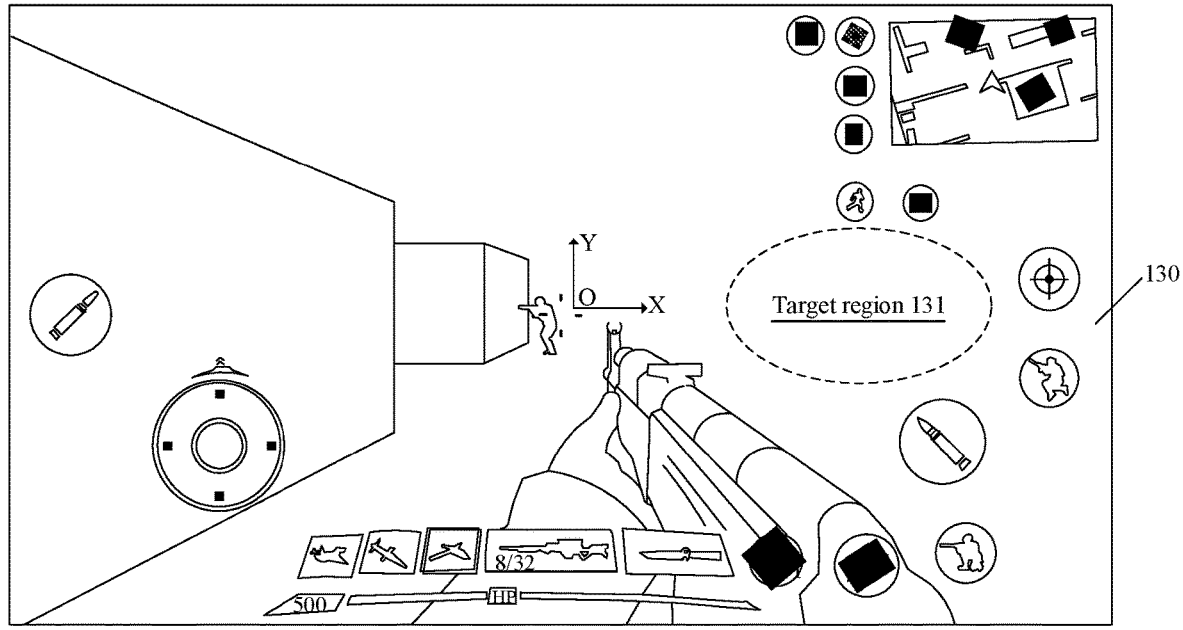
FIG. 6 is a schematic diagram of an interface of establishing a Cartesian coordinate system in a user interface (UI) according to an example embodiment of the disclosure.

FIG. 6 is a schematic diagram of an interface of a target region in a UI according to an example embodiment of the disclosure. For example, a Cartesian coordinate system is established with the center of a UI 130 as the origin. A target region 131 is provided in a right side region of the UI 130 and between a first quadrant and a fourth quadrant in the Cartesian coordinate system. The shape of the target region 131 may be elliptical, but is not limited thereto. In an example, a user performs a double-tap operation in the target region 131 to control a virtual object to open an accessory corresponding to a virtual item.

In an embodiment, the target region 131 may be any region other than an interactive panel region in the UI 130. For example, the target region 131 is an upper side region of the UI 130, referring to a region between a left-side edge and right-side UI controls of the UI 130. Alternatively, the target region 131 is a region corresponding to a position of the virtual item used by the virtual object. For example, the target region 131 is a region corresponding to a virtual weapon (a sniper rifle) used by the virtual object.

For example, a user performs different quick operations in the target region 131 to control the virtual object to perform different motions. For example, the user performs the double-tap operation in the target region 131 to control the virtual object to open the accessory (for example, a sight corresponding to the sniper rifle used by the virtual object) corresponding to the virtual item.

Operation 403: Control the virtual object according to the quick operation to perform a corresponding motion in the virtual environment.

Figure 7:
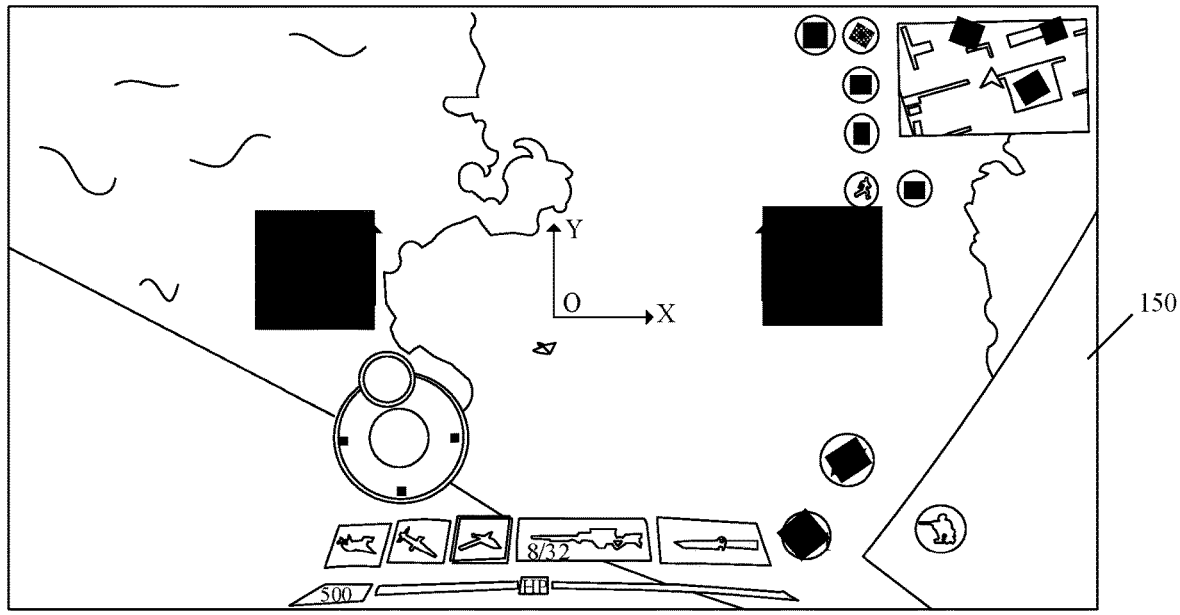
FIG. 7 is a schematic diagram of an interface of controlling a virtual object to stand up according to an example embodiment of the disclosure.

In an embodiment, when a body posture of the virtual object meets a first condition, the virtual object is controlled according to the quick operation to adjust the body posture in the virtual environment. In an embodiment, the first condition includes that the body posture of the virtual object is in a first preset state (e.g., squatting state), and the quick operation includes a two-finger vertical swipe operation. The virtual object may perform actions such as running, jumping, climbing, standing up, and crawling in the virtual environment. The body posture of the virtual object in the virtual environment may be lying prone, squatting, standing, sitting, lying, kneeling, and the like. For illustrative purposes, an example in which the virtual object stands up in the virtual environment is used for description. FIG. 7 is a schematic diagram of an interface of controlling a virtual object to stand up according to an example embodiment of the disclosure.

When the body posture of the virtual object is in a squatting state, because the virtual environment image is an image of observing the virtual environment from the perspective of the virtual object, a UI 150 displays a perspective seen from below, as when the virtual object looks up, for example, an image corresponding to a sky. In an embodiment, fingers of the user swipe upward in the UI 150 at the same time (as shown by the arrow in FIG. 7). With the swipe operation of the user, the virtual environment image in the UI 150 changes, and the proportion of an area of the image corresponding to the sky in the UI 150 decreases. The perspective of the virtual object is in a head-down state. The UI 150 includes ground and scenery of the virtual environment. The user controls the virtual object according to the two-finger vertical swipe operation to stand up in the virtual environment.

In some embodiments, the user controls the virtual object according to the two-finger vertical swipe operation to jump or climb in the virtual environment, or the user controls the virtual object according to a double-tap operation or another quick operation (e.g., when the body posture of the virtual object in the virtual environment is in the squatting state) to stand up in the virtual environment. This is not limited in the disclosure.

In an embodiment, when a use state of a virtual item meets a second condition, the virtual object is controlled according to the quick operation to open an accessory corresponding to the virtual item in the virtual environment. In an embodiment, the second condition includes that the virtual item is in an auto-start state, and the quick operation further includes a double-tap operation. The auto-start state means that the virtual item may start to be used automatically without a trigger operation. For example, when the sight 113 is opened in FIG. 2, a submachine gun automatically makes an attack or opens fire without triggering an attack control or a fire control by the user. An example in which the virtual item is a virtual weapon and the accessory corresponding to the virtual item is a sight (or line of sight in which the virtual item is used) is used for description, as shown in FIG. 2. For example, the virtual weapon 111 used by the virtual object controlled by the user is a submachine gun. When the virtual item is in an auto-start state, the user performs a double-tap operation in a target region to control the virtual object to open the sight 113 corresponding to the submachine gun in the virtual environment. The submachine gun is displayed at the center of the UI 110, and the sight 113 is also displayed at the center of the UI 110.

In an embodiment, when the virtual item is a virtual weapon, the accessory corresponding to the virtual item may be a magazine. For illustrative purposes, an example in which the virtual weapon is a firearm is used for description. When the virtual weapon is in an auto-start state, the user performs a double-tap operation in the target region to control the virtual object to install the magazine for the virtual firearm in the virtual environment.

In some embodiments, the user may control the virtual object according to a double-tap operation to install the accessory of the virtual item, or the user controls the virtual object according to a double-tap and long-press operation or another quick operation to open the accessory corresponding to the virtual item in the virtual environment. This is not limited in the disclosure.

Figure 8:
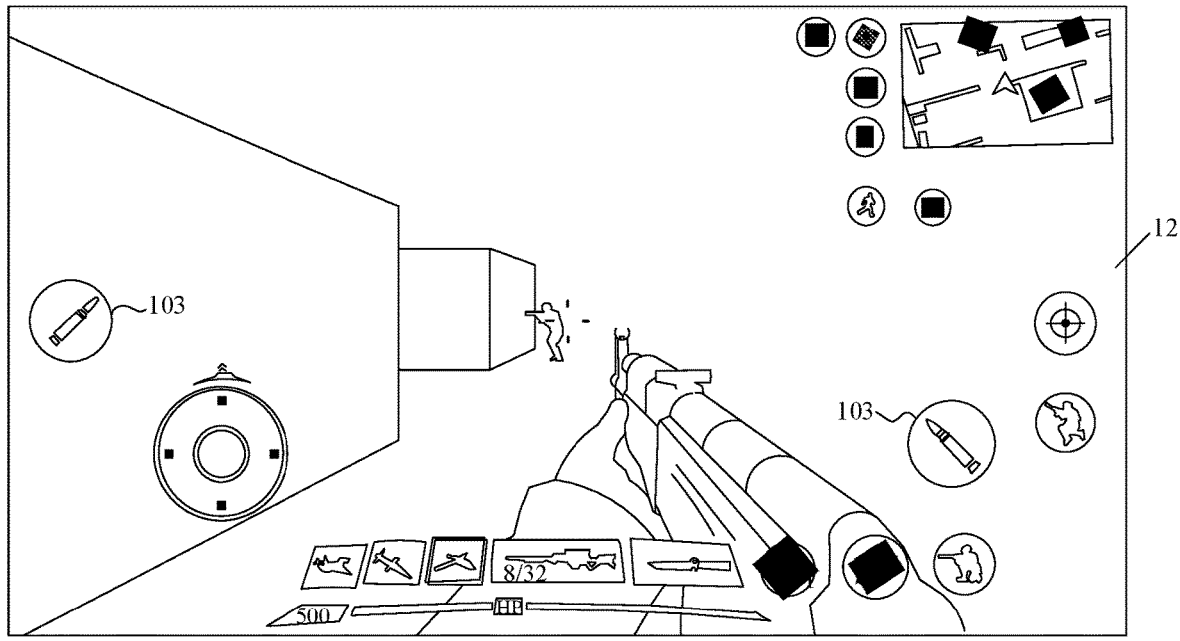
FIG. 8 is a schematic diagram of an example of an interface of controlling a virtual object to start a virtual item.

In an embodiment, when a use state of a virtual item meets a third condition, the virtual object is controlled according to the quick operation to start the virtual item in the virtual environment. In an embodiment, the third condition includes that the virtual item is in a manual start state, and the quick operation further includes a double-tap and long-press operation. The manual start state means that the virtual item requires a trigger operation of the user to be started. For example, the user needs to trigger an attack control to control the virtual object to use the virtual weapon to make an attack. FIG. 8 is a schematic diagram of an example of an interface of controlling a virtual object to make an attack. Two attack controls 103 are displayed in an attack interface 12, and the two attack controls 103 are located in a left side region and a right side region of a UI respectively. For example, a virtual item used by the virtual object controlled by a user is a submachine gun, and the user needs to trigger at least one attack control of the two attack controls 103 to control the virtual object to makes an attack (that is, the submachine gun opens fire).

Figure 9:
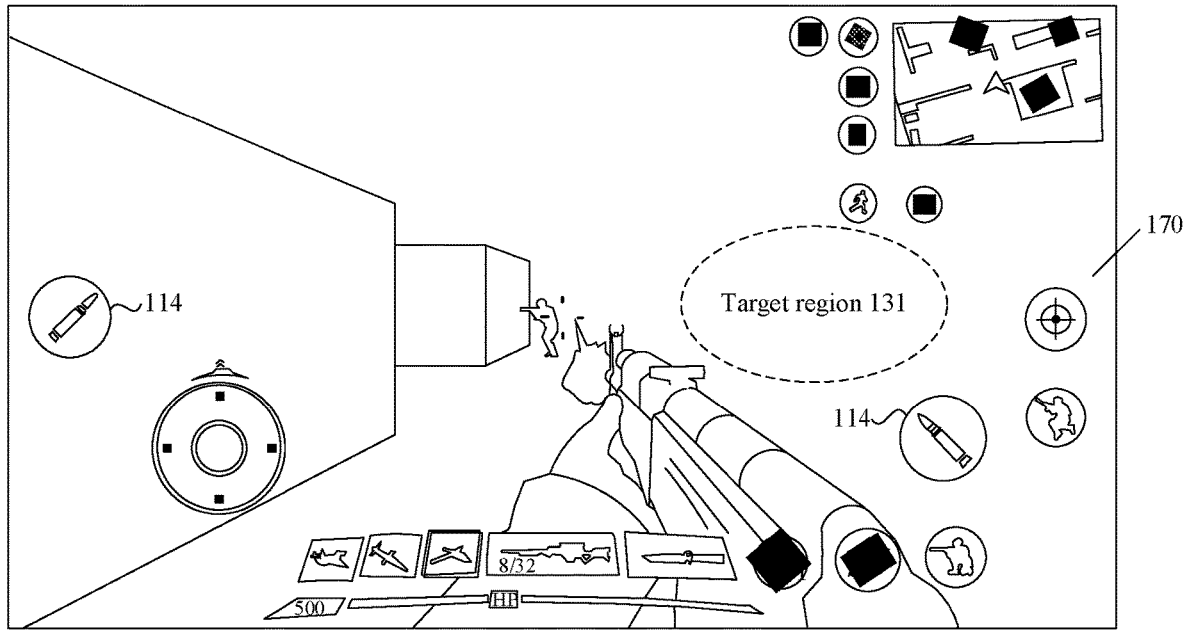
FIG. 9 is a schematic diagram of an interface of controlling a virtual object to start a virtual item according to an example embodiment of the disclosure.

FIG. 9 is a schematic diagram of an interface of controlling a virtual object to start a virtual item according to an example embodiment of the disclosure. A target region 131 and an attack control 114 are displayed in an attack interface 170. A user may control the virtual object according to a double-tap and long-press operation in a target region 131 to start the virtual item. For illustrative purposes, an example in which the virtual item is a sniper rifle and the target region 131 is an elliptical region on a right side of the attack interface 170 is used for description. When the user performs the double-tap and long-press operation in the target region 131, the virtual object is controlled to use the sniper rifle to make an attack (that is, to open fire). In an embodiment, the user may trigger an attack control 114 to control the virtual object to use the sniper rifle to make an attack. In an embodiment, the user may set the quantity of the attack controls 114. For example, there are two attack controls 114 in the UI. Alternatively, an application program corresponding to a game sets the quantity of the attack controls 114 by default. Alternatively, a back-end server intelligently sets the quantity of the attack controls 114 according to use habits and historical records of the user. This is not limited in the disclosure. In an embodiment, the user may adjust a position of the attack control 114 in the UI. According to an actual game status, the position of the attack control 114 in the UI is adjusted in real time to prevent the user from visual disturbance caused by the position of the attack control 114.

In some embodiments, the user may control the virtual object according to a double-tap and long-press operation to perform a first motion (e.g., run continuously), or the user controls the virtual object according to a double-tap operation or another quick operation to perform a second motion (e.g., start the virtual item) in the virtual environment. This is not limited in the disclosure.

In an embodiment, when a use state of a virtual item meets a fourth condition, the virtual object is controlled according to the quick operation to throw the virtual item in the virtual environment. In an embodiment, the fourth condition includes that the virtual object owns the virtual item, and the quick operation further includes a two-finger horizontal swipe operation. When the virtual object owns the virtual item, it means that the virtual object has assembled the virtual item, the virtual item is located in an inventory slot of the virtual object, or is being used by the virtual object.

For illustrative purposes, an example in which the virtual item is a bomb is used for description.

Figure 10:
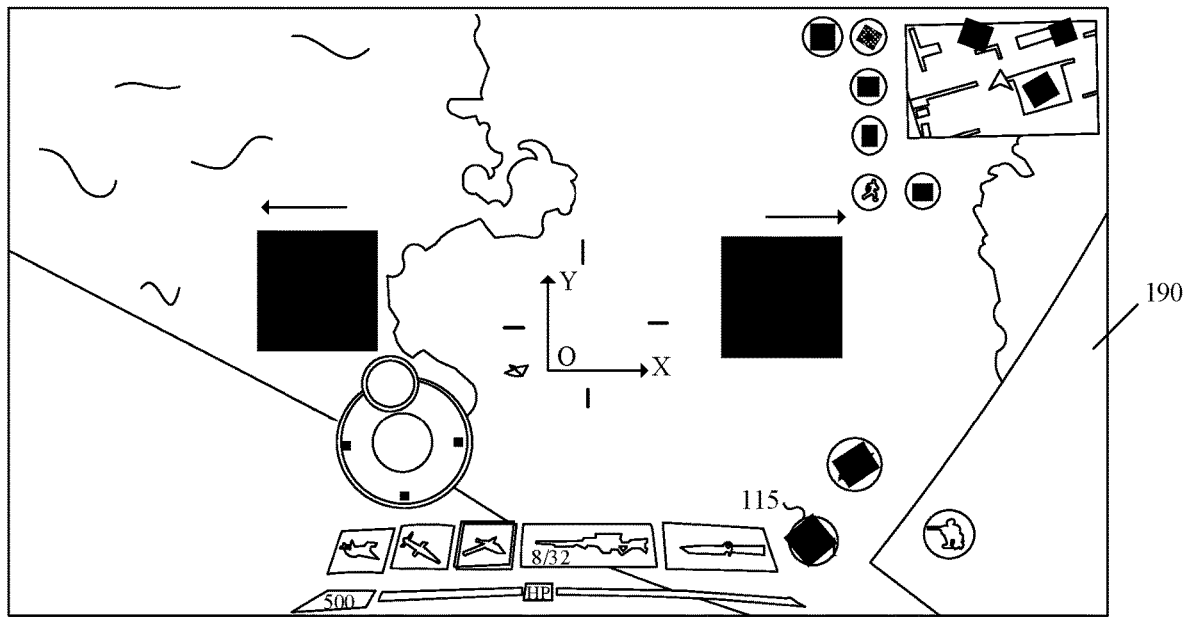
FIG. 10 is a schematic diagram of an interface of controlling a virtual object to throw a virtual item according to an example embodiment of the disclosure.

FIG. 10 is a schematic diagram of an interface of controlling a virtual object to throw a virtual item according to an example embodiment of the disclosure. A bomb 115 owned by the virtual object is displayed in an interface 190. In an embodiment, fingers of the user swipe to the right in a target region at the same time, and when the user stops swiping, the virtual object is controlled to throw the bomb owned by the virtual object. In an embodiment, the user may trigger a weapon control 115 to control the virtual object to throw the bomb. In an embodiment, when the virtual object is in a squatting state, the user controls the virtual object according to a two-finger horizontal swipe operation to stand up and throw the bomb.

In some embodiments, the user controls the virtual object according to a two-finger vertical swipe operation to pick up the virtual item in the virtual environment or to remove the virtual item assembled by the virtual object, or the user controls the virtual object according to a two-finger horizontal swipe operation (as shown by the arrow in FIG. 10). or another quick operation to throw the virtual item in the virtual environment. This is not limited in the disclosure.

As described above, according to example embodiments, a target region is set in a UI, so that without triggering UI controls corresponding to the motions and without memorizing the functions and positions of the UI controls, a user may perform a quick operation in the target region to control a virtual object to perform corresponding motions, to control the virtual object according to the quick operation to perform corresponding motions in a virtual environment.

Figure 11:
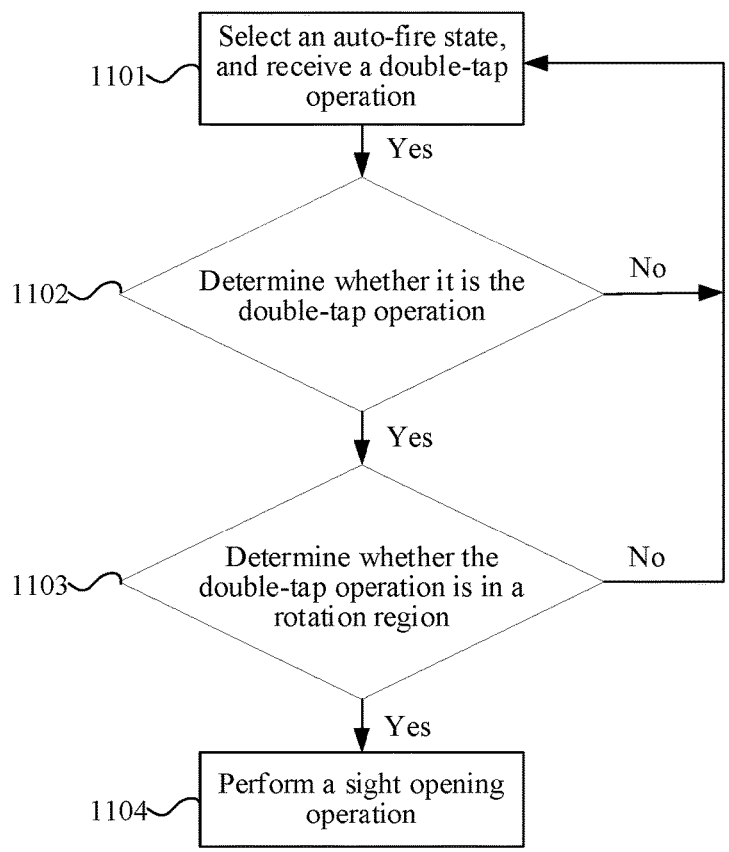
FIG. 11 is a flowchart of a method for controlling a virtual object to open a sight according to an example embodiment of the disclosure.

FIG. 11 is a flowchart of a method for controlling a virtual object to open a sight according to an example embodiment of the disclosure. The method is applicable to the first terminal 120 and/or the second terminal 160 in the computer system shown in FIG. 3 or another terminal in the computer system. The method includes the following operations:

Operation 1101: Select an auto-fire state, and receive a double-tap operation.

For illustrative purposes, an example in which a virtual item is a sniper rifle is used for description. A user selects a state of the sniper rifle to be the auto-fire state, or the user sets the sniper rifle to the auto-fire state. That is, when a virtual object is equipped with the sniper rifle, the sniper rifle is already in the auto-fire state, and no setting is required.

Operation 1102: Determine whether it is the double-tap operation.

For illustrative purposes, an example in which a quick operation of opening a sight (or a line of sight) corresponding to the virtual item is a double-tap operation is used for description. After the user performs the double-tap operation, an application program corresponding to a game determines whether the operation is the double-tap operation. In an embodiment, the application program obtains a time of a first tap operation and a time of a second tap operation of the user. When a time interval between the first tap operation and the second tap operation is less than a time interval threshold, the operation is determined as the double-tap operation. For example, the time interval threshold is 500 ms. When the time interval between the first tap operation and the second tap operation is less than 500 ms, the received operation is determined as the double-tap operation.

Operation 1103: Determine whether the double-tap operation is in a rotation region.

In some embodiments, a target region is also named as a rotation region. The name of the target region is not limited in the disclosure. In an embodiment, if the region receiving the double-tap operation is within a range of the rotation region, the double-tap operation is determined to be in the rotation region. For example, the UI is a rectangular region with a length of 100 units of length and a width of 50 units of length. In an example, the range of the rotation region is a rectangular region formed by a length of more than 50 units of length and less than 100 units of length, and a width of 50 units of length, that is, a right side region relative to the center of the UI. In an example embodiment of FIG. 6, a Cartesian coordinate system is established with the center of the UI as the origin. A region corresponding to a first quadrant and a fourth quadrant of the Cartesian coordinate system is the rotation region. The target region 131 is within the range of the region corresponding to the first quadrant and the fourth quadrant, and the user may perform quick operations in the target region 131 to control the virtual object.

Operation 1104: Perform a sight opening operation.

For illustration, an example in which a virtual item is a sniper rifle is used for description. When the sniper rifle is in the auto-fire state, after the double-tap operation of the user is received in the target region, the application program corresponding to the game controls the virtual object to open the sight of the sniper rifle.

Figure 12:
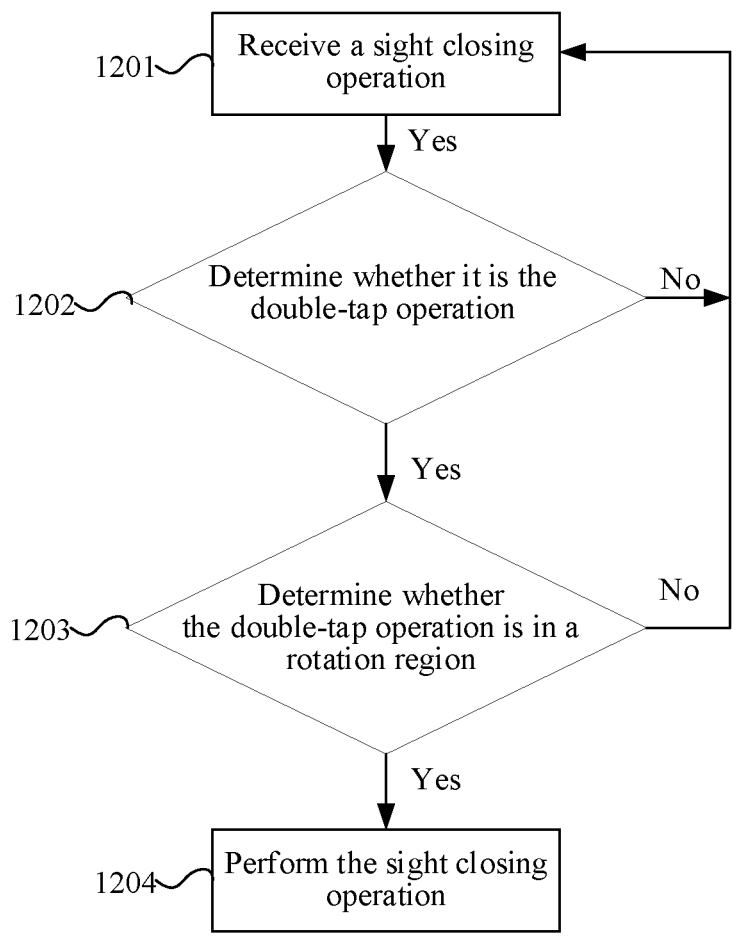
FIG. 12 is a flowchart of a method for controlling a virtual object to close a sight according to an example embodiment of the disclosure.

FIG. 12 is a flowchart of a method for controlling a virtual object to close a sight according to an example embodiment of the disclosure. The method is applicable to the first terminal 120 and/or the second terminal 160 in the computer system shown in FIG. 3 or another terminal in the computer system. The method includes the following operations:

Operation 1201: Receive a sight closing operation.

For illustrative purposes, an example in which a virtual item is a sniper rifle is used for description. When a user needs to close a sight of the sniper rifle, a quick operation is performed in a rotation region in a UI, and an application program closes the sight of the sniper rifle according to the quick operation of the user.

Operation 1202: Determine whether it is the double-tap operation.

In an example, a time interval threshold is 900 ms. When a time interval between a first tap operation and a second tap operation of the user is 500 ms and is less than the time interval threshold, the two tap operations are determined as a double-tap operation. In an embodiment, if the time interval between the first tap operation and the second tap operation is 1 s, the application program records the tap operation as a first tap event (that is, the two tap operations are not determined as a double-tap operation), and the user needs to perform two tap operations again and operation 1202 is performed by calculating a time interval between two tap operations of a second tap event.

Operation 1203: Determine whether the double-tap operation is in a rotation region.

For example, the UI has a length of 100 units of length and a width of 50 units of length. In an example, the range of the rotation region is a rectangular region formed by a length of 20 units to 30 units of length and a width of 45 units of length. When the user performs the double-tap operation within the range of this region, the application program determines that the double-tap operation is in the rotation region.

Operation 1204: Perform the sight closing operation.

In an example, when the sight of the sniper rifle is opened, the user performs the double-tap operation in the rotation region to control the virtual object to close the sight of the sniper rifle.

Figure 13:
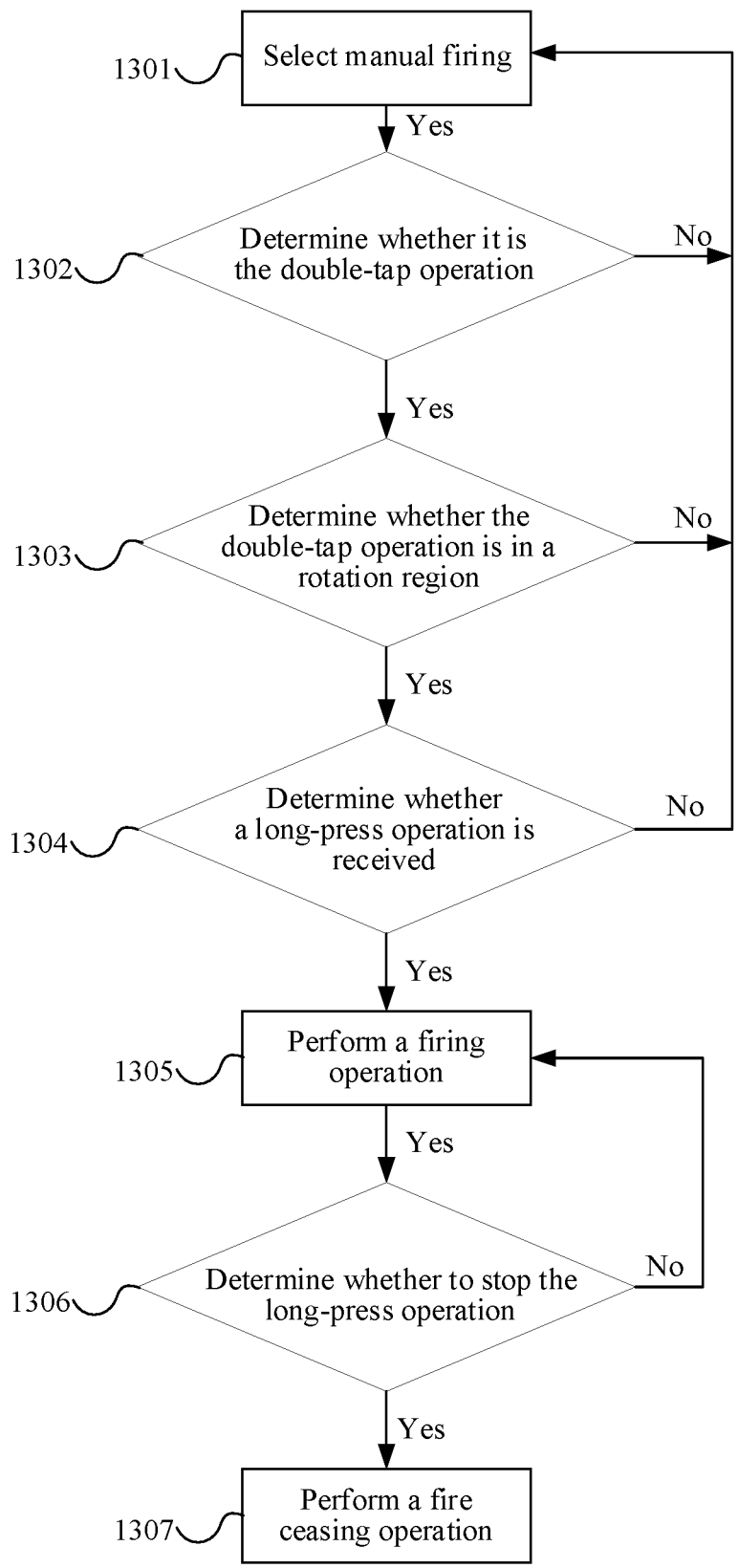
FIG. 13 is a flowchart of a method for controlling a virtual object to open fire according to an example embodiment of the disclosure.

FIG. 13 is a flowchart of a method for controlling a virtual object to open fire according to an example embodiment of the disclosure. The method is applicable to the first terminal 120 and/or the second terminal 160 in the computer system shown in FIG. 3 or another terminal in the computer system. The method includes the following operations:

Operation 1301: Select manual firing.

In an embodiment, a user may set a use mode of a virtual item to a manual start mode, or the virtual item is already in the manual start mode (e.g., a default setting of the virtual item) when the user selects the virtual item. The manual start mode means that the user needs to trigger a corresponding UI control or perform a corresponding operation to control the virtual object to start the virtual item. For illustrative purposes, an example in which a virtual item is a submachine gun is used for description. The user selects a firing mode of the submachine gun as manual firing, and when the user triggers a fire control or an attack control, the virtual object is controlled to use the submachine gun to make an attack (that is, the submachine gun fires bullets).

Operation 1302: Determine whether it is the double-tap operation.

In an example, a time interval between a first tap operation and a second tap operation of the user is 300 ms and is less than a time interval threshold of 500 ms, the first tap operation and the second tap operation of the user are determined as the double-tap operation.

Operation 1303: Determine whether the double-tap operation is in a rotation region.

For example, the UI has a length of 100 units of length and a width of 50 units of length. In an example, the rotation region is a rectangular region formed by a length of more than 50 units of length and less than 100 units of length and a width of 50 units of length, e.g., a right side region relative to the center of the UI. The user performs the double-tap operation in the rotation region.

Operation 1304: Determine whether a long-press operation is received.

After receiving the double-tap operation in the target region, the user also needs to perform a press operation in the target region (that is, the rotation region). When a duration of the press operation is greater than a duration threshold, it is determined that the long-press operation is received in the target region. For example, the duration threshold is 200 ms. When a duration of the press operation of the user is 300 ms and is greater than the duration threshold, the press operation performed by the user is determined as the long-press operation.

Operation 1305: Perform a firing operation.

After the user performs the double-tap operation and the long-press operation in the target region, the virtual object is controlled according to the double-tap and long-press operation to perform the firing operation. In an example, the user performs the double-tap and long-press operation in the target region to control the virtual object to use the submachine gun to perform the firing operation.

Operation 1306: Determine whether to stop the long-press operation.

For illustrative purposes, an example in which a virtual item is a submachine gun is used for description. When the user controls the virtual object to use the submachine gun to open fire, the submachine gun adjusts a firing time according to a duration of the long-press operation of the user. For example, in a firing state, the duration of the long-press operation of the user is 3*s*, and a firing time of the submachine gun is 3*s* according to the duration of the long-press operation.

Operation 1307: Perform a fire ceasing operation.

In an embodiment, when the double-tap and long-press operation in the target region stops, the virtual object is controlled to close the virtual item.

In some embodiments, the double-tap and long-press operation is also named as a double-tap operation and a long-press operation. The name of the quick operation is not limited in the disclosure. It would be understood that the double-tap and long-press operation performed by the user in the target region is performing the double-tap operation first and then performing the long-press operation. In a start state of the virtual item, a duration of the long-press operation is a duration of the virtual item in the start state (e.g., a state in which the virtual item is used). When the long-press operation stops, the virtual item is closed (e.g., the virtual item stops being used).

Figure 14:
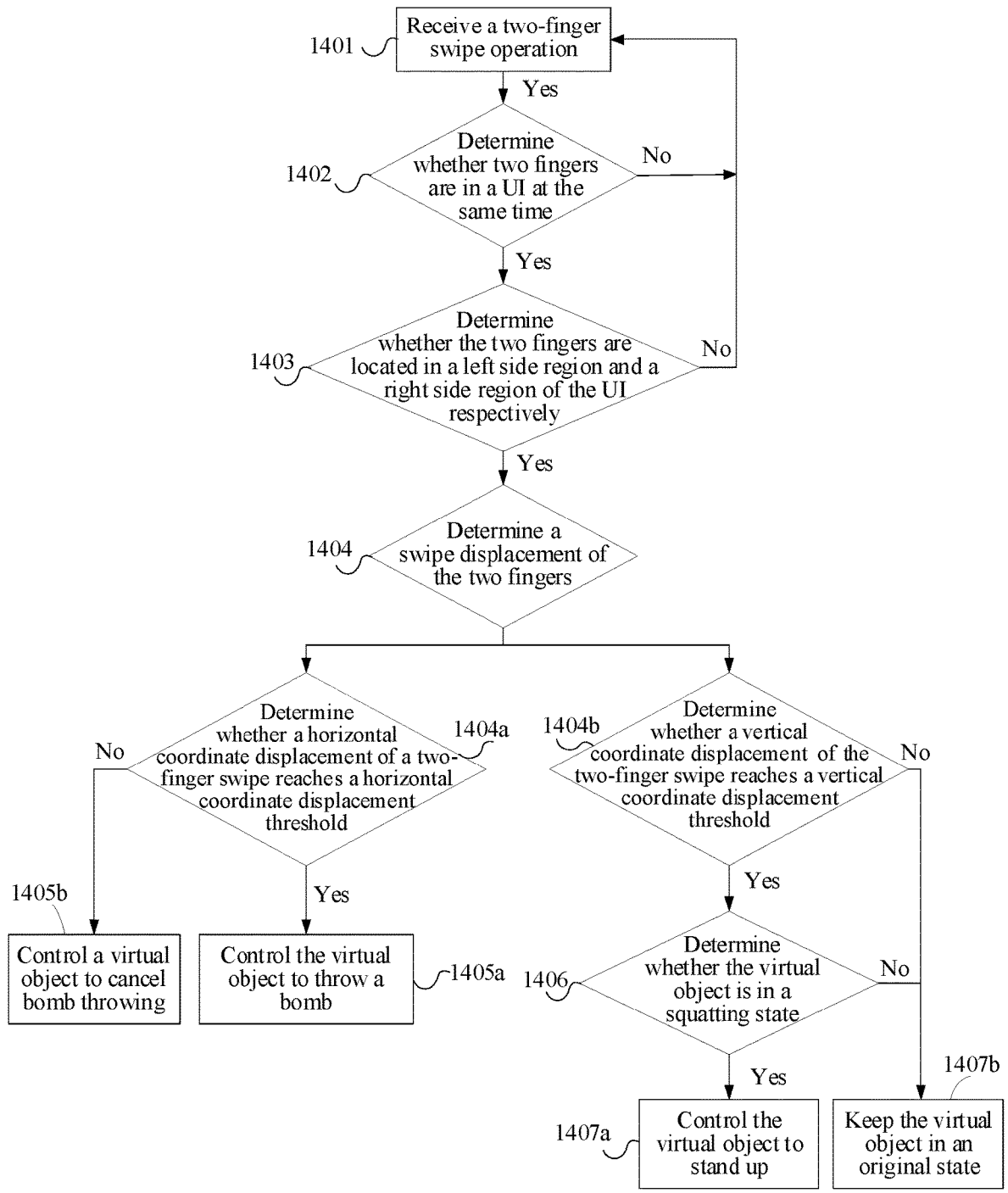
FIG. 14 is a flowchart of a method for controlling a virtual object to stand up and throw a virtual item according to an example embodiment of the disclosure.

FIG. 14 is a flowchart of a method for controlling a virtual object through a two-finger swipe operation according to an example embodiment of the disclosure. The method is applicable to the first terminal 120 and/or the second terminal 160 in the computer system shown in FIG. 3 or another terminal in the computer system. The method includes the following operations:

Operation 1401: Receive a two-finger swipe operation.

A user performs a two-finger swipe operation in a UI. In an embodiment, the two-finger swipe operation includes a two-finger horizontal swipe operation and a two-finger vertical swipe operation.

Operation 1402: Determine whether two fingers are in a UI at the same time.

An application program determines whether two contact points corresponding to the two fingers of the user are in the UI at the same time. In an embodiment, if the two contact points are not in the UI at the same time, a double-tap operation may be determined.

Operation 1403: Determine whether the two fingers are located in a left side region and a right side region of the UI, respectively.

In an embodiment, a target region includes a first target region and a second target region. The application program determines whether the two contact points corresponding to the two fingers are located in the first target region and the second target region respectively. In an embodiment, the contact point corresponding to a left finger of the user is in the first target region (e.g., the left side region of the UI), and the contact point corresponding to a right finger is in the second target region (e.g., the right side region of the UI).

Operation 1404: Determine a swipe displacement of the two fingers.

The application program determines the swipe displacement of the two contact points corresponding to the two fingers in the UI. In an embodiment, the swipe displacement of the two contact points is a horizontal swipe displacement or a vertical swipe displacement. The horizontal swipe displacement refers to a swipe in a direction parallel to a length direction of the UI. The vertical swipe displacement is a swipe in a direction parallel to a width direction of the UI.

Operation 1404*a*: Determine whether a horizontal coordinate displacement of a two-finger swipe reaches a horizontal coordinate displacement threshold.

For example, a two-finger horizontal swipe operation is used as an example for description. In an embodiment, when the two fingers of the user touch the target region in the UI, first start position coordinates of a first contact point in the first target region and second start position coordinates of a second contact point in the second target region are obtained; when the first contact point and the second contact point stop swiping, first end position coordinates of the first contact point in the first target region and second end position coordinates of the second contact point in the second target region are obtained; and when a horizontal coordinate displacement of the first contact point is greater than a horizontal coordinate displacement threshold and a horizontal coordinate displacement of the second contact point is greater than the horizontal coordinate displacement threshold, it is determined that the two-finger horizontal swipe operation is received in the target region. In an example, the horizontal coordinate displacement threshold is two units of length. The first start position coordinates of the first contact point are (−1, 1), the second start position coordinates are (1, 1), the first end position coordinates of the first contact point are (−4, 1), and the second end position coordinates of the second contact point are (4, 1). The horizontal coordinate displacement of the first contact point and the horizontal coordinate displacement of the second contact point are both three units of length and are both greater than the horizontal coordinate displacement threshold (two units of length), the vertical coordinates of the first contact point and the vertical coordinates of the second contact point have no displacement during swiping of the contact point, and the application program determines that the two-finger swipe operation is the two-finger horizontal swipe operation.

Operation 1404*b*: Determine whether a vertical coordinate displacement of the two-finger swipe reaches a vertical coordinate displacement threshold.

For example, a two-finger vertical swipe operation is used as an example for description. In an embodiment, when the two fingers of the user touch the target region in the UI, first start position coordinates of a first contact point in the first target region and second start position coordinates of a second contact point in the second target region are obtained; when the first contact point and the second contact point stop swiping, first end position coordinates of the first contact point in the first target region and second end position coordinates of the second contact point in the second target region are obtained; and when a vertical coordinate displacement of the first contact point is greater than a vertical coordinate displacement threshold and a vertical coordinate displacement of the second contact point is greater than the vertical coordinate displacement threshold, it is determined that the two-finger vertical swipe operation is received in the target region. In an example, the vertical coordinate displacement threshold is two units of length. The first start position coordinates of the first contact point are (−1, 1), the second start position coordinates are (1, 1), the first end position coordinates of the first contact point are (−1, −3), and the second end position coordinates of the second contact point are (1, −3). The vertical coordinate displacement of the first contact point and the vertical coordinate displacement of the second contact point are both four units of length and are both greater than the vertical coordinate displacement threshold (two units of length), the horizontal coordinates of the first contact point and the horizontal coordinates of the second contact point have no displacement during swiping of the contact point, and the application program determines that the two-finger swipe operation is the two-finger vertical swipe operation.

Operation 1405*a*: Control a virtual object to throw a bomb.

In an embodiment, the application program controls, according to the two-finger horizontal swipe operation performed by the user, the virtual object to throw the bomb.

Operation 1405b: Control the virtual object to cancel bomb throwing.

In an embodiment, when a horizontal coordinate displacement of any one contact point of the first contact point and the second contact point is less than the horizontal coordinate displacement threshold, the application program controls the virtual object to cancel bomb throwing. In an embodiment, when the application program determines that the quick operation performed by the user is the two-finger swipe operation, if the user does not own the virtual item (such as a bomb), the virtual object is controlled to cancel bomb throwing.

Operation 1406: Determine whether the virtual object is in a first preset state, such as a squatting state.

For example, a body posture of the virtual object in the virtual environment is in the squatting state.

Operation 1407a: Control the virtual object to switch to a second preset state, such as to stand up.

For example, when the body posture of the virtual object in the virtual environment is in the squatting state, the two-finger vertical swipe operation controls the virtual object to stand up in the virtual environment.

Operation 1407b: Keep the virtual object in an original state.

For example, when the body posture of the virtual object in the virtual environment is not in the squatting state, for example, the body posture of the virtual object is in a standing state, the virtual object is still kept in the standing state after the user performs the two-finger vertical swipe operation.

In an embodiment, the double-tap operation may control the virtual object to install the accessory of the virtual item, the double-tap and long-press operation may control the virtual object to perform actions such as continuous running and jumping, the two-finger horizontal swipe operation may control the virtual object to perform actions such as picking up virtual items, pushing windows open, and opening doors, and the two-finger vertical swipe operation may control the virtual object to perform actions such as squatting, lying prone, and rolling.

The foregoing method is described based on a game application scenario in the foregoing embodiments, and the following is an example description of the foregoing method based on a military simulation application scenario.

A simulation technology is a model technology in which a system behavior or process is reflected by using software and hardware through an experiment of simulating a real environment.

A military simulation program is a program specially constructed for military application by using the simulation technology, which performs quantitative analysis on battle elements such as sea, land, and air, weapon equipment performance, battle action, and the like, to accurately simulate a battlefield environment, and present a battlefield status, thereby achieving battle system evaluation and decision aids.

In an example, soldiers set up a virtual battlefield on a terminal on which the military simulation program is located, and fight in teams. The soldiers control virtual objects in the virtual battlefield environment to perform at least one operation of walking, running, climbing, driving, shooting, throwing, reconnaissance, and close combat in the virtual battlefield environment. The virtual battlefield environment includes at least one natural form of a plain, a mountain, a plateau, a basin, a desert, a river, a lake, a sea, and vegetation, and a place form such as a building, a vehicle, a ruin, and a training ground. The virtual object includes a virtual character, a virtual animal, a cartoon character, or the like. Each virtual object owns a shape and a size in a three-dimensional virtual environment, and occupies some space in the three-dimensional virtual environment.

Based on the foregoing case, in an example, a virtual object a controlled by a soldier A performs corresponding motions in a virtual environment.

As shown in FIG. 7, when a body posture of the virtual object a in the virtual environment is in a squatting state, the perspective of the virtual object a is a perspective seen from below, as when the virtual object looks up, and as such, a virtual environment image corresponds to a sky (or a substantial portion of the virtual environment image corresponds to a sky). The soldier A performs a two-finger vertical swipe operation in a target region in a UI of the military simulation program. In an embodiment, the target region includes a first target region and a second target region. Two fingers of the soldier A are in the first target region and the second target region respectively. For example, a left finger of the soldier A is in the first target region, and a right finger is in the second target region. The left finger and the right finger of the soldier A swipe upward in the target regions respectively at the same time (as shown by the arrow in FIG. 7) to control the virtual object a to stand up in the virtual environment. In an embodiment, when the body posture of the virtual object a in the virtual environment is in a standing state, the soldier A performs a two-finger vertical swipe operation (the swiping direction is opposite to a direction shown in FIG. 7) in the target region to control the virtual object a to squat in the virtual environment.

For example, a virtual item used by the virtual object a is a sniper rifle, and the sniper rifle is in an auto-start state. The soldier A performs two tap operations in a target region 131 in the UI of the military simulation program (as shown in FIG. 2). When a time interval between a first tap operation and a second tap operation is less than a time interval threshold, the military simulation program determines that the two tap operations are a double-tap operation. The double-tap operation is performed in the target region 131, and the soldier A may open a sight corresponding to the sniper rifle according to the double-tap operation. In an embodiment, after the sight is opened, the soldier A may close the sight corresponding to the sniper rifle according to the double-tap operation in the target region.

For example, a virtual item used by the virtual object a is a submachine gun, and the submachine gun is in a manual start state. The soldier A performs a double-tap and long-press operation in the target region 131 in the UI of the military simulation program (as shown in FIG. 6). The military simulation program determines whether the two tap operations of the soldier A are a double-tap operation. If the two tap operations are the double-tap operation, the military simulation program continues to determine whether the press operation of the soldier A is a long-press operation. When a duration of the press operation of the soldier A is greater than a duration threshold, it is determined that a quick operation in the target region 131 is the double-tap and long-press operation. The military simulation program controls the virtual object a according to the double-tap and long-press operation to start the submachine gun (that is, to use the submachine gun to open fire as shown in FIG. 9). In an embodiment, when the soldier A stops the long-press operation, the military simulation program controls the virtual object a to close a firing function of the submachine gun, and a duration of the long-press operation is a firing duration of the submachine gun.

For example, a virtual item used by the virtual object a is a bomb, and the bomb is owned by the virtual object a. The soldier A performs a two-finger horizontal swipe operation in a target region in a UI of the military simulation program. In an embodiment, the target region includes a first target region and a second target region. Two fingers of the soldier A are in the first target region and the second target region respectively. For example, a left finger of the soldier A is in the first target region, and a right finger is in the second target region. The left finger and the right finger of the soldier A swipe to the right in the target regions respectively at the same time (as shown by the arrow in FIG. 10) to control the virtual object a to throw the bomb. In an embodiment, when the virtual object a is in a building in the virtual environment, the soldier A may control the virtual object a according to two-finger horizontal swipe operation to open doors and windows. Alternatively, when there are virtual items in the virtual environment, the soldier A may control the virtual object a according to the two-finger horizontal swipe operation to pick up the virtual items in the virtual environment.

Based on the above, in the embodiments of the disclosure, the foregoing method for controlling a virtual object is applied to a military simulation program, thereby improving battle efficiency, and helping to facilitate cooperation among soldiers.

The following is an apparatus embodiment of the disclosure. For details not described in detail in the apparatus embodiment, reference may be made to corresponding record in the foregoing method embodiments. Details are not described herein again.

Figure 15:
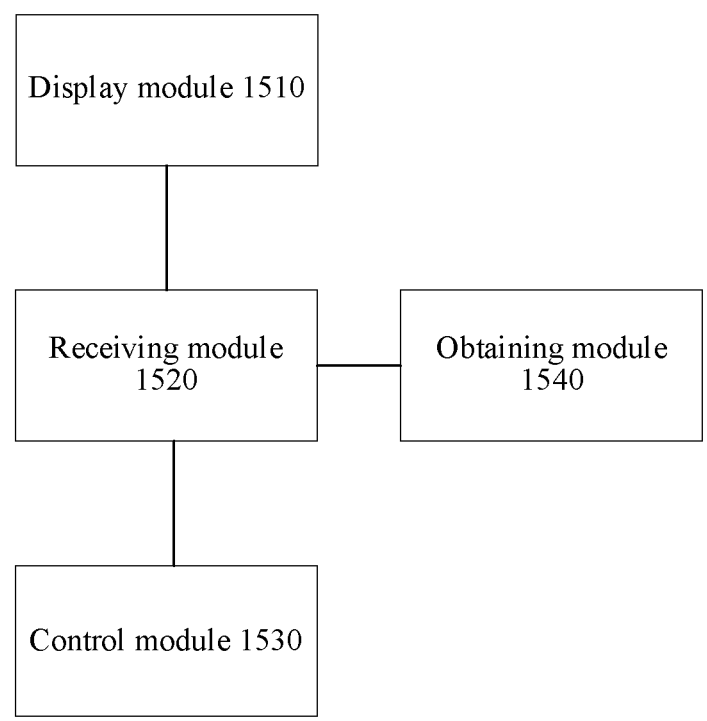
FIG. 15 is a block diagram of an apparatus for controlling a virtual object according to an example embodiment of the disclosure.

FIG. 15 is a schematic structural diagram of an apparatus for controlling a virtual object according to an example embodiment of the disclosure. The apparatus may be implemented as all or a part of the terminal by using software, hardware, or a combination thereof. The apparatus includes: a display module 1510, a receiving module 1520, a control module 1530, and an obtaining module 1540. The display module 1510 and the receiving module 1530 are optional modules.

The display module 1510 is configured to display a UI, the UI including a virtual environment image and an interactive panel region, the virtual environment image being an image of observing a virtual environment from the perspective of a virtual object.

The receiving module 1520 is configured to receive a quick operation in a target region in the UI, the target region including a region pertaining to the virtual environment image but not pertaining to the interactive panel region.

The control module 1530 is configured to control the virtual object according to the quick operation to perform a corresponding motion in the virtual environment.

In an example embodiment, the control module 1530 is further configured to control, when a body posture of the virtual object meets a first condition, the virtual object according to the quick operation to adjust the body posture in the virtual environment.

In an example embodiment, the first condition includes that the body posture of the virtual object is in a squatting state; the quick operation includes a two-finger vertical swipe operation; the receiving module 1520 is further configured to receive the two-finger vertical swipe operation in the target region; and the control module 1530 is further configured to control, when the body posture of the virtual object is in a first preset state, such as the squatting state, the virtual object according to the two-finger vertical swipe operation to switch from the first preset state (e.g., squatting state) to a second preset state (e.g., standing state) in the virtual environment.

In an example embodiment, the target region includes a first target region and a second target region; the obtaining module 1540 is configured to obtain first start position coordinates of a first contact point in the first target region and second start position coordinates of a second contact point in the second target region; the obtaining module 1540 is further configured to obtain, when the first contact point and the second contact point stop swiping, first end position coordinates of the first contact point in the first target region and second end position coordinates of the second contact point in the second target region; and the receiving module 1520 is further configured to determine, when a vertical coordinate displacement of the first contact point is greater than a vertical coordinate displacement threshold and a vertical coordinate displacement of the second contact point is greater than the vertical coordinate displacement threshold, that the two-finger vertical swipe operation is received in the target region.

In an example embodiment, the control module 1530 is further configured to control, when a use state of a virtual item meets a second condition, the virtual object according to the quick operation to open an accessory corresponding to the virtual item in the virtual environment; or the control module 1530 is further configured to control, when a use state of a virtual item meets a third condition, the virtual object according to the quick operation to start the virtual item in the virtual environment; or the control module 1530 is further configured to control, when a use state of a virtual item meets a fourth condition, the virtual object according to the quick operation to throw the virtual item in the virtual environment.

In an example embodiment, the second condition includes that the virtual item is in an auto-start state; the quick operation further includes a double-tap operation; the receiving module 1520 is further configured to receive the double-tap operation in the target region; and the control module 1530 is further configured to control, when a first virtual item is in the auto-start state, the virtual object according to the double-tap operation to open a sight corresponding to the first virtual item in the virtual environment.

In an example embodiment, the obtaining module 1540 is further configured to obtain a time of a first tap operation and a time of a second tap operation in the target region; and the receiving module 1510 is further configured to determine, when a time interval between the first tap operation and the second tap operation is less than a time interval threshold, that the double-tap operation is received in the target region.

In an example embodiment, the third condition includes that the virtual item is in a manual start state; the quick operation further includes a double-tap and long-press operation; the receiving module 1510 is further configured to receive the double-tap and long-press operation in the target region; and the control module 1530 is further configured to control, when a second virtual item is in a manual start state, the virtual object according to the double-tap and long-press operation to start the second virtual item in the virtual environment.

In an example embodiment, the receiving module 1510 is further configured to receive a press operation in the target region after the double-tap operation in the target region is received; and determine, when a duration of the press operation is greater than a duration threshold, that the double-tap and long-press operation is received in the target region.

In an example embodiment, the control module 1530 is further configured to control, when the double-tap and long-press operation in the target region stops, the virtual object to close the virtual item.

In an example embodiment, the fourth condition includes that the virtual object owns the virtual item; the quick operation further includes a two-finger horizontal swipe operation; the receiving module 1510 is further configured to receive the two-finger horizontal swipe operation in the target region; and the control module 1530 is further configured to control, when the virtual object owns a third virtual item, the virtual object according to the two-finger horizontal swipe operation to throw the third virtual item in the virtual environment.

In an example embodiment, the target region includes a first target region and a second target region; the obtaining module 1540 is further configured to obtain first start position coordinates of a first contact point in the first target region and second start position coordinates of a second contact point in the second target region; the obtaining module 1540 is further configured to obtain, when the first contact point and the second contact point stop swiping, first end position coordinates of the first contact point in the first target region and second end position coordinates of the second contact point in the second target region; and the receiving module 1510 is further configured to determine, when a horizontal coordinate displacement of the first contact point is greater than a horizontal coordinate displacement threshold and a horizontal coordinate displacement of the second contact point is greater than the horizontal coordinate displacement threshold, that the two-finger horizontal swipe operation is received in the target region.

Figure 16:
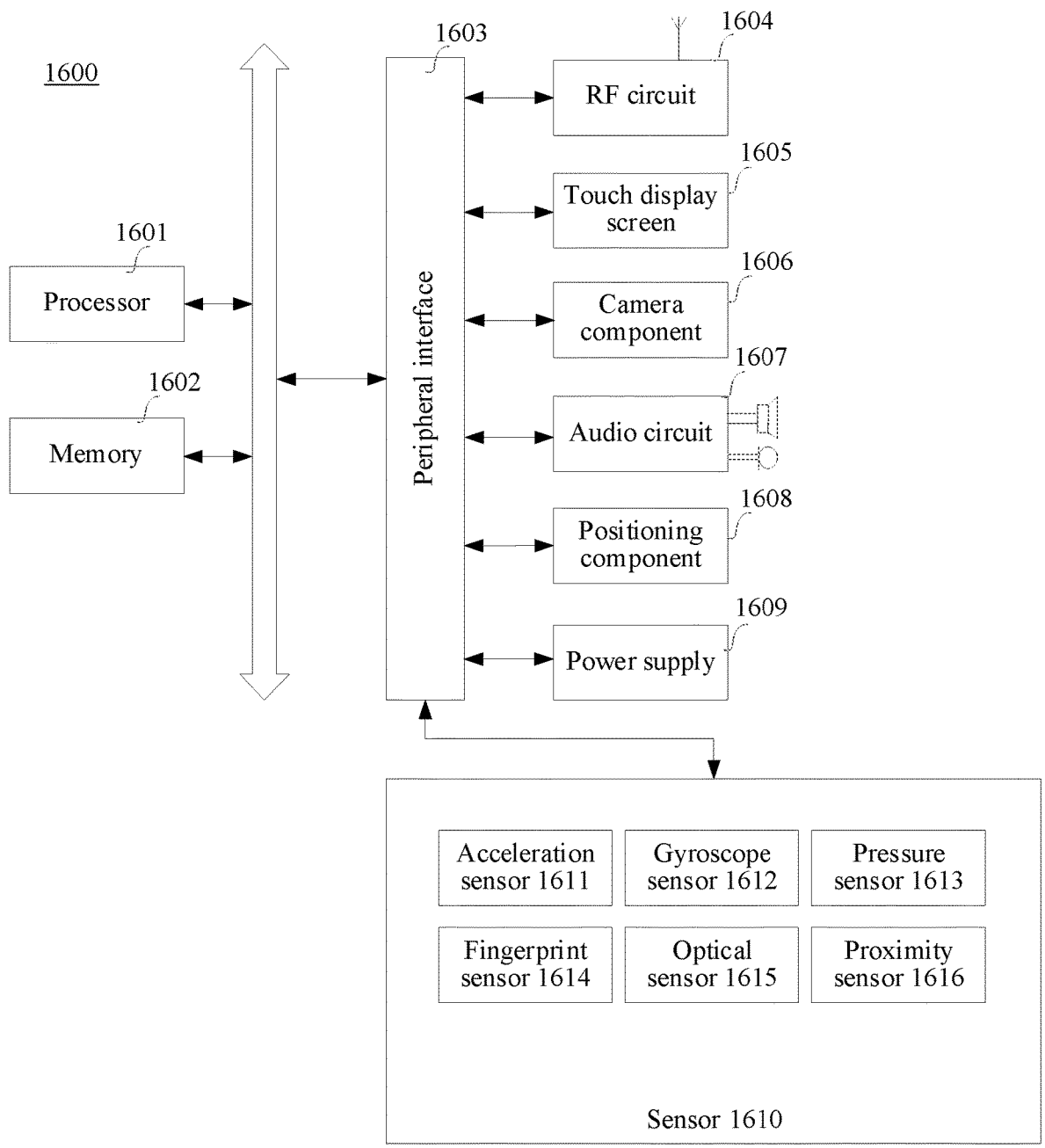
FIG. 16 is a schematic structural diagram of an apparatus of a computer device according to an example embodiment of the disclosure.

FIG. 16 shows a structural block diagram of a computer device 1600 according to an example embodiment of the disclosure. The computer device 1600 may be a portable mobile terminal, such as a smartphone, a tablet computer, an MP3 player, or an MP4 player. The computer device 1600 may be further referred to as another name such as user equipment or a portable terminal.

Generally, the computer device 1600 includes a processor 1601 and a memory 1602.

The processor 1601 may include one or more processing cores. For example, the processor 1601 may be a 4-core processor or an 8-core processor. The processor 1601 may be implemented in at least one hardware form of a digital signal processor (DSP), a field-programmable gate array (FPGA), and a programmable logic array (PLA). The processor 1601 may alternatively include a main processor and a coprocessor. The main processor is configured to process data in an active state, also referred to as a central processing unit (CPU). The coprocessor is a low-power processor configured to process data in a standby state. In some embodiments, the processor 1601 may be integrated with a graphics processing unit (GPU). The GPU is configured to be responsible for rendering and drawing content that a display needs to display. In some embodiments, the processor 1601 may further include an artificial intelligence (AI) processor. The AI processor is configured to process a computing operation related to machine learning.

The memory 1602 may include one or more computer-readable storage media. The computer-readable storage medium may be tangible and non-transient. The memory 1602 may further include a high-speed random access memory and a non-volatile memory, for example, one or more disk storage devices or flash memory devices. In some embodiments, the non-transient computer-readable storage medium in the memory 1602 is configured to store at least one instruction. The at least one instruction is executed by the processor 1601 to perform the method for controlling a virtual object provided in the disclosure.

In some embodiments, the computer device 1600 may further include a peripheral interface 1603 and at least one peripheral. Specifically, the peripheral includes at least one of a radio frequency (RF) circuit 1604, a touch display screen 1605, a camera 1606, an audio circuit 1607, a positioning assembly 1608, and a power supply 1609.

The peripheral interface 1603 may be configured to connect at least one peripheral related to input/output (I/O) to the processor 1601 and the memory 1602. In some embodiments, the processor 1601, the memory 1602, and the peripheral interface 1603 are integrated on the same chip or circuit board. In some other embodiments, any one or two of the processor 1601, the memory 1602, and the peripheral interface 1603 may be implemented on a separate chip or the circuit board. This is not limited in this embodiment.

The RF circuit 1604 is configured to receive and transmit an RF signal, which is also referred to as an electromagnetic signal. The RF circuit 1604 communicates with a communication network and other communication devices through the electromagnetic signal. The RF circuit 1604 converts an electric signal into an electromagnetic signal for transmission, or converts a received electromagnetic signal into an electric signal. In an embodiment, the RF circuit 1604 includes an antenna system, an RF transceiver, one or more amplifiers, a tuner, an oscillator, a digital signal processor, a codec chip set, a subscriber identity module card, and the like. The RF circuit 1604 may communicate with another terminal by using at least one wireless communication protocol. The wireless communication protocol includes, but is not limited to, a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 1604 may further include a circuit related to a near field communication (NFC) circuit. This is not limited in the disclosure.

The touch display screen 1605 is configured to display an UI. The UI may include a graph, text, an icon, a video, and any combination thereof. The touch display screen 1605 also has a capability of collecting a touch signal on or above a surface of the touch display screen 1605. The touch signal may be used as a control signal to be inputted to the processor 1601 for processing. The touch display screen 1605 is configured to provide a virtual button and/or a virtual keyboard, which is also referred to as a soft button and/or a soft keyboard. In some embodiments, there is one touch display screen 1605, disposed on a front panel of the computer device 1600. In some other embodiments, there may be at least two touch display screens 1605, respectively disposed on different surfaces of the computer device 1600 or designed in a foldable shape. In still some other embodiments, the touch display screen 1605 may be a flexible display screen, disposed on a curved surface or a folded surface of the computer device 1600. Even, the touch display screen 1605 may be further set in a non-rectangular irregular pattern, namely, a special-shaped screen. The touch display screen 1605 may be made of a material such as a liquid crystal display (LCD) or an organic light-emitting diode (OLED).

A camera component 1606 is configured to collect an image or a video. In an embodiment, the camera component

1606 includes a front-facing camera and a rear-facing camera. Generally, the front-facing camera is configured to implement a video call or self-portrait. The rear-facing camera is configured to capturing a picture or a video. In some embodiments, there are at least two rear-facing cameras, each of which is any one of a main camera, a depth of field camera and a wide-angle camera, so as to implement a background blurring function by fusing the main camera and the depth of field camera, and panoramic shooting and VR shooting functions by fusing the main camera and the wide-angle camera. In some embodiments, the camera component 1606 may further include a flash. The flash may be a single-color-temperature flash, or may be a double-color-temperature flash. The double-color-temperature flash refers to a combination of a warm-light flash and a cold-light flash, and may be used for light compensation under different color temperatures.

The audio circuit 1607 is configured to provide an audio interface between a user and the computer device 1600. The audio circuit 1607 may include a microphone and a speaker. The microphone is configured to acquire sound waves of a user and an environment, and convert the sound waves into electrical signals and input the electrical signals into the processor 1601 for processing, or input the electrical signals into the RF circuit 1604 to implement speech communication. For the purpose of stereo sound collection or noise reduction, there may be a plurality of microphones, respectively disposed at different parts of the computer device 1600. The microphone may further be an array microphone or an omni-directional acquisition type microphone. The speaker is configured to convert electrical signals from the processor 1601 or the RF circuit 1604 into sound waves. The speaker may be a conventional thin-film speaker or a piezoelectric ceramic speaker. When the speaker is the piezoelectric ceramic speaker, the speaker may not only convert an electrical signal into sound waves audible to a human being, but also convert an electrical signal into sound waves inaudible to the human being for ranging and other purposes. In some embodiments, the audio circuit 1607 may also include an earphone jack.

The positioning component 1608 is configured to determine a current geographic location of the computer device 1600 through positioning, to implement navigation or a location based service (LBS). The positioning component 1608 may be a positioning assembly based on the Global Positioning System (GPS) of the United States, the China's Beidou Navigation Satellite System (BDS), or the Galileo system of Russia.

The power supply 1609 is configured to supply power to components in the computer device 1600. The power supply 1609 may be an alternating current, a direct current, a primary battery, or a rechargeable battery. When the power supply 1609 includes a rechargeable battery, the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charge technology.

In some embodiments, the computer device 1600 further includes one or more sensors 1610. The one or more sensors 1610 include, for example but are not limited to, an acceleration sensor 1611, a gyroscope sensor 1612, a pressure sensor 1613, a fingerprint sensor 1614, an optical sensor 1615, and a proximity sensor 1616.

The acceleration sensor 1611 may detect accelerations on three coordinate axes of a coordinate system established by the computer device 1600. For example, the acceleration sensor 1611 may be configured to detect components of gravity acceleration on the three coordinate axes. The processor 1601 may control, according to a gravity acceleration signal collected by the acceleration sensor 1611, the touch display screen 1605 to display the UI in a frame view or a portrait view. The acceleration sensor 1611 may be further configured to collect motion data of a game or a user.

The gyroscope sensor 1612 may detect a body direction and a rotation angle of the computer device 1600. The gyroscope sensor 1612 may cooperate with the acceleration sensor 1611 to collect a 3D action by the user on the computer device 1600. The processor 1601 may implement the following functions according to the data collected by the gyroscope sensor 1612: motion sensing (such as changing the UI according to a tilt operation of the user), image stabilization during shooting, game control, and inertial navigation.

The pressure sensor 1613 may be disposed on a side frame of the computer device 1600 and/or a lower layer of the touch display screen 1605. When the pressure sensor 1613 is disposed at the side frame of the computer device 1600, a holding signal of the user on the computer device 1600 may be detected, and left/right hand identification and a quick operation may be performed according to the holding signal. When the pressure sensor 1613 is disposed at the lower layer of the touch display screen 1605, an operable control in the UI interface may be controlled according to a pressure operation of the user on the touch display screen 1605. The operable control includes at least one of a button control, a scroll-bar control, an icon control, and a menu control.

The fingerprint sensor 1614 is configured to collect a fingerprint of a user to identify the identity of the user according to the collected fingerprint. When identifying that the identity of the user is a trusted identity, the processor 1601 authorizes the user to perform related sensitive operations. The sensitive operations include: unlocking a screen, viewing encryption information, downloading software, paying and changing a setting, and the like. The fingerprint sensor 1614 may be disposed on a front face, a back face, or a side face of the computer device 1600. When a physical button or a vendor logo is disposed on the computer device 1600, the fingerprint sensor 1614 may be integrated together with the physical button or the vendor logo.

The optical sensor 1615 is configured to collect ambient light intensity. In an embodiment, the processor 1601 may control display brightness of the touch display screen 1605 according to the ambient light intensity collected by the optical sensor 1615. Specifically, when the ambient light intensity is relatively high, the display brightness of the touch display screen 1605 is increased. When the ambient light intensity is relatively low, the display brightness of the touch display screen 1605 is decreased. In another embodiment, the processor 1601 may further dynamically adjust a camera parameter of the camera component 1606 according to the ambient light intensity collected by the optical sensor 1615.

The proximity sensor 1616, also referred to as a distance sensor, may be disposed on the front surface of the computer device 1600. The proximity sensor 1616 is configured to collect a distance between a front face of the user and the front surface of the computer device 1600. In an embodiment, when the proximity sensor 1616 detects that the distance between the front face of the user and the front face of the computer device 1600 is gradually decreased, the processor 1601 controls the touch display screen 1605 to switch from a screen-on state to a screen-off state. When the proximity sensor 1616 detects that the distance between the front face of the user and the front face of the computer device 1600 is gradually increased, the processor 1601 controls the touch display screen 1605 to switch from the screen-off state to the screen-on state.

A person skilled in the art would understand that the structure shown in FIG. 16 does not constitute any limitation on the computer device 1600, and the computer device may include more components or fewer components than those shown in the figure, or some components may be combined, or a different component deployment may be used.

The disclosure further provides a computer device. The computer device includes a processor and a memory. The memory stores at least one instruction, at least one program, a code set, or an instruction set. The at least one instruction, the at least one program, the code set, or the instruction set is loaded and executed by the processor to implement the method for controlling a virtual object provided in the foregoing method embodiments.

In addition, an embodiment of the disclosure further provides a storage medium. The storage medium is configured to store a computer program. The computer program is configured to perform the method for controlling a virtual object provided in the foregoing embodiments.

An embodiment of the disclosure further provides a computer program product including instructions. The instructions, when run on a computer, cause the computer to perform the method for controlling a virtual object provided in the foregoing embodiments.

It is to be understood that "plurality of" mentioned in this specification means two or more. "And/or" describes an association relationship for associated objects and represents that three relationships may exist. For example, A and/or B may represent the following three cases: only A exists, both A and B exist, and only B exists. The character "/" generally indicates an "or" relationship between the associated objects.

A person of ordinary skill in the art would understand that all or some of the operations of the foregoing embodiments may be implemented by using hardware, or may be implemented by a program instructing relevant hardware. The program may be stored in a computer-readable storage medium. The storage medium may be a read-only memory (ROM), a magnetic disk, an optical disc, or the like.

The technical solutions provided in the embodiments of the disclosure achieve at least the following beneficial effects.

A target region is set in a UI for a user to perform a quick operation in the target region to control a virtual object to perform corresponding motions, so that without triggering UI controls corresponding to the motions and without memorizing the functions and positions of the UI controls, the user may control the virtual object according to the quick operation to perform corresponding motions in a virtual environment.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The foregoing descriptions are merely example embodiments of the disclosure, but are not intended to limit the disclosure. Any modification, equivalent replacement, or improvement made within the spirit and principle of the disclosure shall fall within the protection scope of the disclosure.

What is claimed is:

1. A method for controlling a virtual object, performed by a terminal, the method comprising:
    displaying a user interface (UI), the UI comprising a virtual environment image and an interactive panel region, the interactive panel region being a region in the UI comprising a plurality of pre-determined action controls;
    receiving a preset operation in a target region in the UI, wherein the target region is a region of a first range in the UI excluding the interactive panel region; and
    controlling, based on a use state of a virtual item meeting a condition, the virtual object to perform a corresponding motion or action corresponding to the virtual item in the virtual environment based on the preset operation, wherein the performing the corresponding motion or action based on the preset operation comprises:
        controlling, based on the use state of the virtual item meeting a second condition, the virtual object according to the preset operation to open an accessory corresponding to the virtual item in the virtual environment;
        or
        controlling, based on the use state of the virtual item meeting a third condition, the virtual object according to the preset operation to start to use the virtual item in the virtual environment;
        or
        controlling, based on the use state of the virtual item meeting a fourth condition, the virtual object according to the preset operation to throw the virtual item in the virtual environment.

2. The method according to claim 1, wherein the performing the corresponding motion or action further comprises:
    controlling, based on a body posture of the virtual object meeting a first-fifth condition, the virtual object according to the preset operation to adjust the body posture in the virtual environment.

3. The method according to claim 2, wherein the first condition comprises that the body posture of the virtual object is in a squatting state; the preset operation comprises a two-finger vertical swipe operation; and the controlling, based on the body posture of the virtual object meeting the first condition, the virtual object according to the preset operation to adjust the body posture in the virtual environment comprises:
receiving the two-finger vertical swipe operation in the target region; and
controlling, based on the body posture of the virtual object being in the squatting state, the virtual object according to the two-finger vertical swipe operation to switch from the squatting state to a standing state in the virtual environment.

4. The method according to claim 3, wherein the target region comprises a first target region and a second target region; and the receiving the two-finger vertical swipe operation in the target region comprises:
obtaining first start position coordinates of a first contact point in the first target region and second start position coordinates of a second contact point in the second target region;
obtaining, based on swiping of the first contact point and the second contact point being stopped, first end position coordinates of the first contact point in the first target region and second end position coordinates of the second contact point in the second target region; and
determining, based on a vertical coordinate displacement of the first contact point being greater than a vertical coordinate displacement threshold and a vertical coordinate displacement of the second contact point being greater than the vertical coordinate displacement threshold, that the two-finger vertical swipe operation is received in the target region.

5. The method according to claim 1, wherein the second condition comprises that the virtual item is in an auto-start state; the preset operation further comprises a double-tap operation; and the controlling, based on the use state of the virtual item meeting the second condition, the virtual object according to the preset operation to open the accessory corresponding to the virtual item in the virtual environment comprises:
receiving the double-tap operation in the target region; and
controlling, based on a first virtual item being in the auto-start state, the virtual object according to the double-tap operation to open a sight corresponding to the first virtual item in the virtual environment.

6. The method according to claim 5, wherein the receiving the double-tap operation in the target region comprises:
obtaining a time of a first tap operation and a time of a second tap operation in the target region; and
determining, based on a time interval between the first tap operation and the second tap operation being less than a time interval threshold, that the double-tap operation is received in the target region.

7. The method according to claim 1, wherein the third condition comprises that the virtual item is in a manual start state; the preset operation further comprises a double-tap and long-press operation; and the controlling, based on the use state of the virtual item meeting the third condition, the virtual object according to the preset operation to start to use the virtual item in the virtual environment comprises:
receiving the double-tap and long-press operation in the target region; and
controlling, based on a second virtual item being in the manual start state, the virtual object according to the double-tap and long-press operation to start to use the second virtual item in the virtual environment.

8. The method according to claim 7, wherein the receiving the double-tap and long-press operation in the target region comprises:
receiving a press operation in the target region after a double-tap operation in the target region is received; and
determining, based on a duration of the press operation being greater than a duration threshold, that the double-tap and long-press operation is received in the target region.

9. The method according to claim 7, wherein after the controlling, based on the second virtual item being in the manual start state, the virtual object according to the double-tap and long-press operation to start to use the second virtual item in the virtual environment, the method further comprises:
controlling, based on the double-tap and long-press operation in the target region being stopped, the virtual object to stop using the virtual item.

10. The method according to claim 1, wherein the fourth condition comprises that the virtual object owns the virtual item; the preset operation further comprises a two-finger horizontal swipe operation; and the controlling, based on the use state of the virtual item meeting the fourth condition, the virtual object according to the preset operation to throw the virtual item in the virtual environment comprises:
receiving the two-finger horizontal swipe operation in the target region; and
controlling, based on the virtual object owning a third virtual item, the virtual object according to the two-finger horizontal swipe operation to throw the third virtual item in the virtual environment.

11. The method according to claim 10, wherein the target region comprises a first target region and a second target region; and the receiving the two-finger horizontal swipe operation in the target region comprises:
obtaining first start position coordinates of a first contact point in the first target region and second start position coordinates of a second contact point in the second target region;
obtaining, based on swiping of the first contact point and the second contact point being stopped, first end position coordinates of the first contact point in the first target region and second end position coordinates of the second contact point in the second target region; and
determining, based on a horizontal coordinate displacement of the first contact point being greater than a horizontal coordinate displacement threshold and a horizontal coordinate displacement of the second contact point being greater than the horizontal coordinate displacement threshold, that the two-finger horizontal swipe operation is received in the target region.

12. An apparatus for controlling a virtual object, comprising:
at least one memory configured to store program code; and
at least one processor configured to read the program code and operate as instructed by the program code, the program code comprising:

display code configured to cause the at least one processor to display a user interface (UI), the UI comprising a virtual environment image and an interactive panel region, the interactive panel region being a region in the UI comprising a plurality of pre-determined action controls;

receiving code configured to cause the at least one processor to receive a preset operation in a target region in the UI, wherein the target region is a region of a first range in the UI excluding the interactive panel region; and control code configured to cause the at least one processor to control, based on a use state of a virtual item meeting a condition, the virtual object to perform a corresponding motion or action corresponding to the virtual item in the virtual environment based on the preset operation, wherein the performing the corresponding motion or action based on the preset operation comprises:

controlling, based on the use state of the virtual item meeting a second condition, the virtual object according to the preset operation to open an accessory corresponding to the virtual item in the virtual environment;

or controlling, based on the use state of the virtual item meeting a third condition, the virtual object according to the preset operation to start to use the virtual item in the virtual environment;

or controlling, based on the use state of the virtual item meeting a fourth condition, the virtual object according to the preset operation to throw the virtual item in the virtual environment.

13. The apparatus according to claim 12, wherein the control code is further configured to cause the at least one processor to control, based on a body posture of the virtual object meeting a fifth condition, the virtual object according to the preset operation to adjust the body posture in the virtual environment.

14. The apparatus according to claim 13, wherein the first condition comprises that the body posture of the virtual object is in a squatting state; the preset operation comprises a two-finger vertical swipe operation; and wherein the control code is further configured to cause the at least one processor to, based on receiving the two-finger vertical swipe operation in the target region and based on the body posture of the virtual object being in the squatting state, control the virtual object according to the two-finger vertical swipe operation to switch from the squatting state to a standing state in the virtual environment.

15. The apparatus according to claim 14, wherein the target region comprises a first target region and a second target region; and the receiving code is further configured to cause the at least one processor to obtain first start position coordinates of a first contact point in the first target region and second start position coordinates of a second contact point in the second target region; obtain, based on swiping of the first contact point and the second contact point being stopped, first end position coordinates of the first contact point in the first target region and second end position coordinates of the second contact point in the second target region; and determine, based on a vertical coordinate displacement of the first contact point being greater than a vertical coordinate displacement threshold and a vertical coordinate displacement of the second contact point being greater than the vertical coordinate displacement threshold, that the two-finger vertical swipe operation is received in the target region.

16. The apparatus according to claim 12, wherein the second condition comprises that the virtual item is in an auto-start state; the preset operation further comprises a double-tap operation; and the control code is further configured to cause the at least one processor to control, based on receiving the double-tap operation in the target region and based on a first virtual item being in the auto-start state, the virtual object according to the double-tap operation to open a sight corresponding to the first virtual item in the virtual environment.

17. A non-transitory storage medium, configured to store a computer program, the computer program being executable by at least one processor to perform:

displaying a user interface (UI), the UI comprising a virtual environment image and an interactive panel region, the interactive panel region being a region in the UI comprising a plurality of pre-determined action controls;

receiving a preset operation in a target region in the UI, wherein the target region is a region of a first range in the UI excluding the interactive panel region; and controlling, based on a use state of a virtual item meeting a condition, the virtual object to perform a corresponding motion or action corresponding to the virtual item in the virtual environment based on the preset operation, wherein the performing the corresponding motion or action based on the preset operation comprises:

controlling, based on the use state of the virtual item meeting a second condition, the virtual object according to the preset operation to open an accessory corresponding to the virtual item in the virtual environment;

or controlling, based on the use state of the virtual item meeting a third condition, the virtual object according to the preset operation to start to use the virtual item in the virtual environment;

or controlling, based on the use state of the virtual item meeting a fourth condition, the virtual object according to the preset operation to throw the virtual item in the virtual environment.

18. The non-transitory storage medium according to claim 17, wherein the performing the corresponding motion or action further comprises:

controlling, based on a body posture of the virtual object meeting a fifth condition, the virtual object according to the preset operation to adjust the body posture in the virtual environment.

* * * * *